United States Patent [19]

Matsuoka et al.

[11] Patent Number: 4,881,900

[45] Date of Patent: Nov. 21, 1989

[54] SENSING DISPLAY APPARATUS OF IMAGE PATTERN

[75] Inventors: Mikiharu Matsuoka, Tokyo; Yasuhiro Yamada, Yokohama; Yasuko Miyazaki, Sagamihara; Takashi Kanemoto, Machida; Hirohiko Katayama, Kawasaki; Tamao Ikuta, Yokohama, all of Japan

[73] Assignee: Canon Kabushiki Kaisha, Tokyo, Japan

[21] Appl. No.: 76,180

[22] Filed: Jul. 21, 1987

[30] Foreign Application Priority Data

| Jul. 23, 1986 | [JP] | Japan | 61-174052 |
| Aug. 4, 1986 | [JP] | Japan | 61-183029 |
| Aug. 4, 1986 | [JP] | Japan | 61-183077 |
| Aug. 4, 1986 | [JP] | Japan | 61-183078 |
| Nov. 20, 1986 | [JP] | Japan | 61-179619[U] |

[51] Int. Cl.$^4$ .................. G09B 21/00; G06K 9/00
[52] U.S. Cl. .................. 434/113; 434/114; 382/1
[58] Field of Search .................. 434/113, 114; 382/1

[56] References Cited

U.S. PATENT DOCUMENTS 4,475,234 10/1984 Nishijima et al. .................. 382/1

OTHER PUBLICATIONS

"A Monolithic Image Sensor for a Reading Aid for the Blind," *Proc. IEEE*, vol. 58, #9, Sep. 1970, Salsbury et al.

"An Aid to the Blind: An Optical-to-Tactile Converter of Wide Images," Ciolli et al., *Inst. Naz. Office*, (Italy) vol. 34.

"A Reading Eye for the Blind," Brugler et al., *Optical Spectra*, Feb. 1971.

"Proceedings of IFIP Congress 80"—Tokyo—6-9 Oct. 1980, Melbourne, 14-17 Oct. 1980, pp. 951-954, North Holland.

Publishing Co., Amsterdam N1; W. Schwewikhardt: "A Computer Based Education System for the Blind". Wescon Technical Papers, vol. 17, San Francisco, 11-14 Sep. 1973, pp. 1 and 2, Wescon, Los Angeles, U.S.; R. D. Melen: "A One-Hand Optacon".

*Primary Examiner*—Thomas H. Tarcza
*Assistant Examiner*—Ian J. Lobo
*Attorney, Agent, or Firm*—Fitzpatrick, Cella, Harper & Scinto

[57] ABSTRACT

Selecting switches are provided near a converter for converting an optical image into an electric signal, thereby enabling the electric signal before or after it was stored to be effectively selected. A plurality of convertors are provided and when an electric signal is not output from one of the convertors, the other convertors can be used. The analog electric signal output from the converter is binarized by a reference level signal before it fluctuates. An electric power consumption when the apparatus is not used is prevented by a power controller arranged near a sensing display.

10 Claims, 23 Drawing Sheets

FIG. 4A CLOCK CK
FIG. 4B PHOTODIODE 1
FIG. 4C PHOTODIODE 2
FIG. 4D PHOTODIODE 3
FIG. 4E PHOTODIODE 4
FIG. 4F PHOTODIODE 5
FIG. 4G SYNCH. SIGNAL SY

FIG. 10
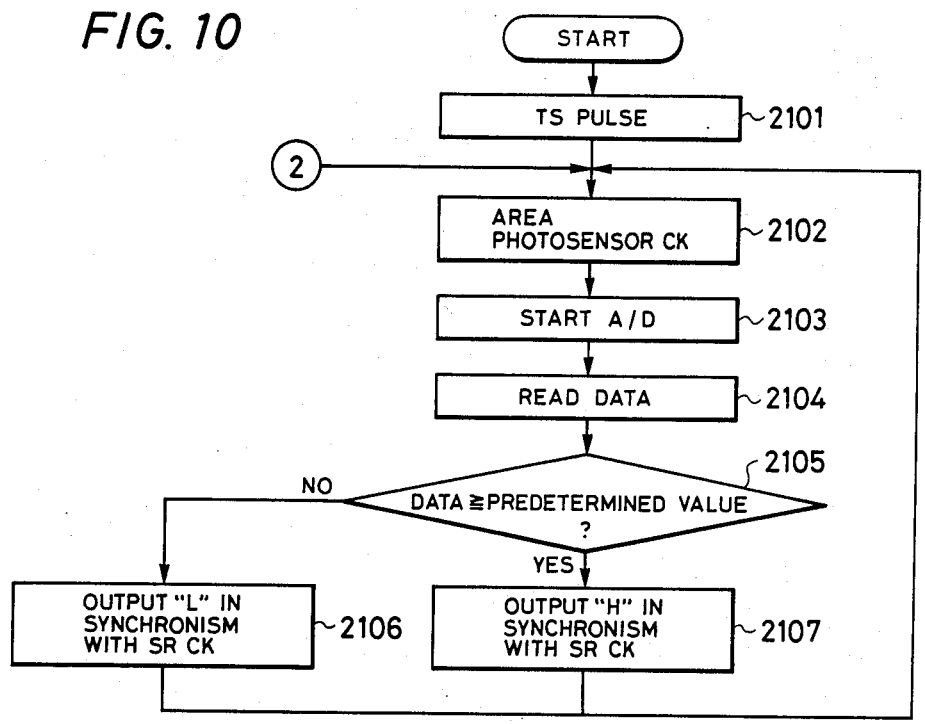
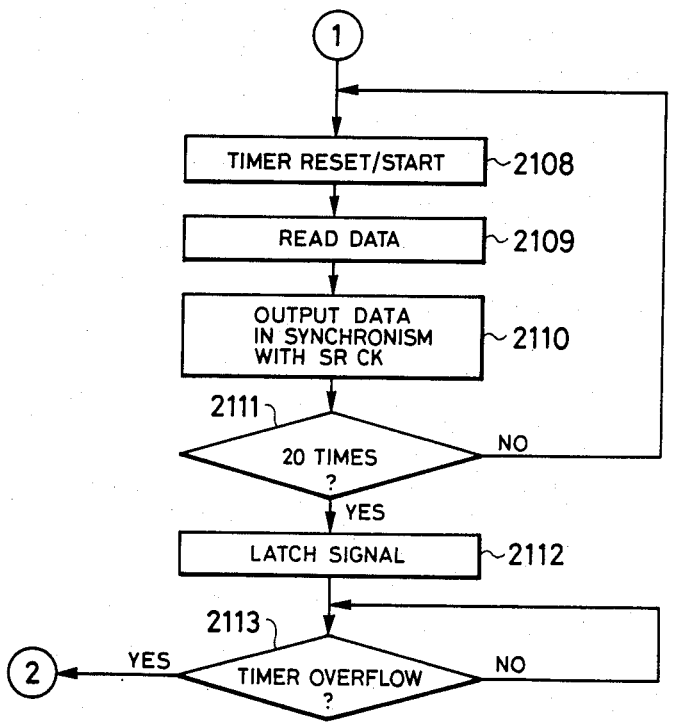

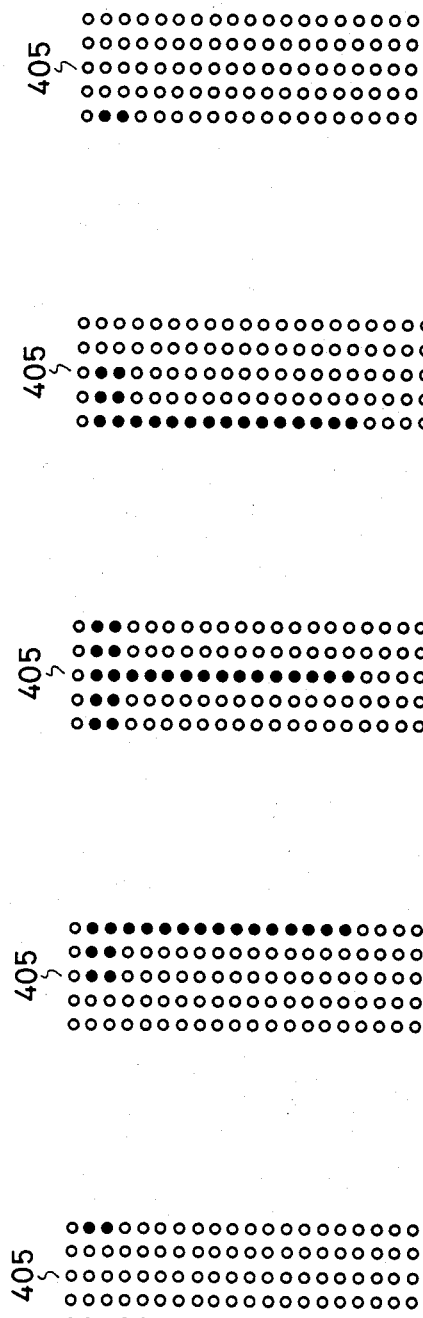
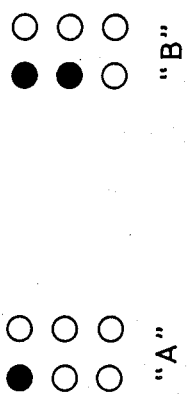
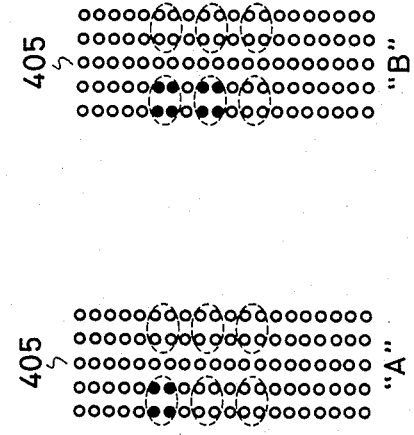

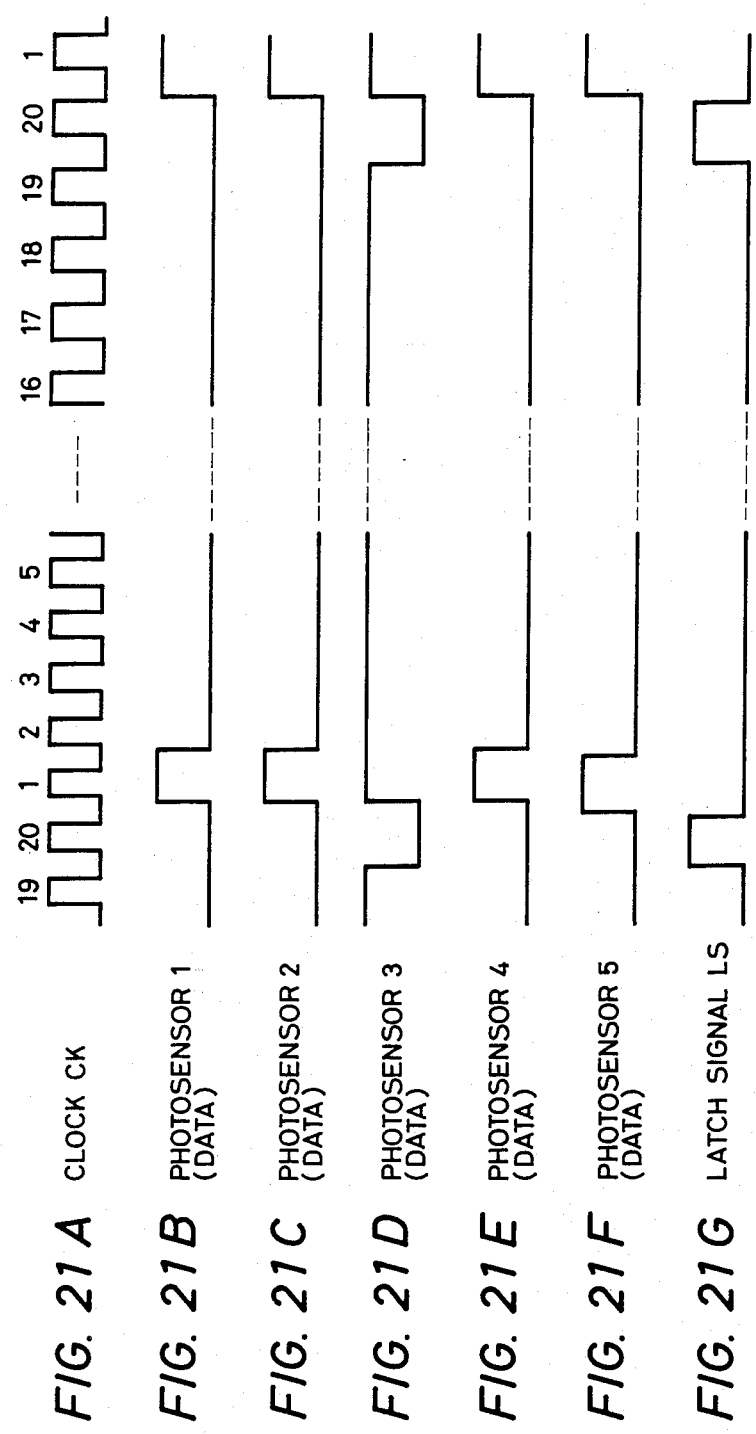

FIG. 24

SENSING DISPLAY APPARATUS OF IMAGE PATTERN

BACKGROUND OF THE INVENTION

1. Field of the Invention

The present invention relates to an image converting apparatus for eyesight handicapped persons in which optical image data such as characters, symbols, or the like or electrical image data is input and converted into vibration patterns, and these patterns are output and displayed by a sensing display device consisting of an array of transducers arranged in a matrix form.

2. Related Background Art

The first content of the conventional technique will be first described.

Such a kind of sensing display apparatus has been put into practical use as a reading apparatus for blind persons in which characters, symbols, or the like which were optically read are converted into electric signals and displayed by the projecting vibrations of a tactile array on a Bimorph tactile array arranged in a matrix form, thereby enabling the image data to be sensed by the finger tip. As patent references regarding such an apparatus, for example, there have been known a scanning apparatus disclosed in Japanese Patent Publication No. 43424/1981, a power source checker disclosed in Japanese Patent Publication No. 46081/1981 an optical/mechanical converting apparatus disclosed in Japanese Patent Publication No. 46854/1981, and the like.

FIG. 2 is a schematic perspective view of a reading apparatus for blind persons which has conventionally been used. In FIG. 2, when a camera unit 101 is put on a paper 103 and moved on the paper, data such as characters, symbols, or the like which was read by the camera unit 101 is output as projecting vibrations on a tactile array 105. The tactile array 105 consists of (5×20) pins arranged in a matrix form. For example, when the camera unit 101 is located on a character "T" on the paper, the individual pins of the tactile array project and vibrate in a form of "T". The blind person senses these vibrations by the finger tip, thereby recognizing the character "T".

However, in the case of recognizing the character "T" by the conventional reading apparatus for blind persons, an instructor who can see repeatedly slides on the character "T" by the camera unit 101 many times while looking at the character "T", and the blind person learns a pattern of character "T" by being taught by the instructor. In this manner, the blind person must train. Thus, a long training period is needed.

As described above, the blind person needs to train for a long time and the instructor to instruct this training is necessary until the blind person can skillfully operate such an apparatus. Therefore, this drawback makes it difficult to spread such a kind of apparatus. These drawbacks are set to the first problem.

The second content of the conventional technique will now be described.

FIG. 7 is a perspective view showing a constitution of a reading apparatus for blind persons which has conventionally been used. In FIG. 7, when a camera unit 201 is put on a printed matter 203 and moved in the direction indicated by an arrow on the paper, the data such as characters, symbols, or the like which was read by the camera unit 201 is output as projecting vibrations on a tactile stimulator 205. The tactile stimulator 205 consists of (5×20) pins arranged in a matrix form. For example, when the camera unit 201 is located on a character "T" on the printed matter, the individual pins of the tactile stimulator project and vibrate in a form of "T". The blind person senses the vibrations by the finger tip, thereby recognizing the character "T".

On the other hand, when a single instructor instructs two blind persons, as shown in FIG. 7, another main unit 204' having a tactile stimulator 205' is connected to a main unit 204 by a connecting cord $C_1$. In the case of instructing three blind persons, another main unit 204" is connected to the main unit 204' by a connecting cord $C_2$. In such a case, if a failure occurred in the connecting cord $C_1$, camera unit 201, or main unit 204, not only the tactile stimulator 205 of the main unit 204 but also the tactile stimulator 205' of the main unit 204' and a tactile stimulator (not shown) of the main unit 204" cannot be used. If the main unit 204 failed, the camera unit 201 is detached from the main unit 204 and the connecting cord $C_1$ is disconnected from the main unit 204'. Thereafter, the camera unit 201 is connected to the main unit 204'. Thus, the tactile stimulators of the main units 204' and 204" can be used. However, as mentioned above, it is troublesome to again connect the camera unit 201, connecting cord $C_1$, and the like and it is very inconvenient. These drawbacks are set to the second problem.

The third content of the conventional technique will now be described.

Hitherto, as one of such a kind of pattern reading apparatuses, as shown in e.g. Japanese Patent Publication No. 46854/1986, there has been put into practical use a reading apparatus for blind persons in which a pattern which was optically read by a camera unit is converted into an electric signal, and by vibrating a Bimorph tactile array arranged in a matrix form, the read pattern is displayed. However, in such a conventional apparatus, the input signal from the camera unit is compared with a threshold voltage by a comparator, and the read pattern is binarized into a light portion and a dark portion.

Therefore, when the voltage difference between the light portion and the dark portion in the output signal of the camera unit is small, the output signal of the camera unit is easily influenced by the noise component included in the threshold voltage (reference voltage which is input to the comparator). In particular, in the case of reading an image of a low contrast such as a colored original document or the like, there is a drawback such that it is difficult to adjust the threshold level. In addition, there is a drawback such that a display pattern easily flickers or the like due to the noise component. These drawbacks are set to the third problem.

The fourth content of the conventional technique will now be described. As mentioned above, it is necessary to train for a long time until the blind person can certainly read by the finger tip the data such as characters, symbols, or the like which is output and displayed on the sensing display device to display the read pattern as a tactile pattern. In such a training, it is demanded to use personal computers, which have particularly been spread in recent years. However, in the conventional apparatus, an output signal of the personal computer cannot be input.

Further, to improve the training efficiency, it is demanded to simultaneously output the same output pattern to a plurality of similar sensing display devices by an output signal of a single input apparatus. However, such a demand cannot be realized.

On the other hand, in general, eyesight handicapped persons such as blind persons or the like who use the foregoing conventional reading apparatuses are superior in the tactile-reading of Braille. There are many requirements for an apparatus to convert electric image data signals or data signals from various kinds of external terminal apparatuses into Braille. However, the conventional apparatuses cannot satisfy such requirements. These drawbacks are set to the fourth problem.

Further, the fifth content of the conventional technique will be described. The foregoing image converting apparatus is always carried and used by a blind person. Therefore, a battery must be used as a power source because of limitations of size, weight, and the like. By use of a battery as a power source, those limitations can be eliminated. However, the user is anxious since he cannot know a remaining battery's capacity. There is a possibility such that the operation of the apparatus becomes unstable due to a voltage drop by the lack of battery capacity. When a wrong pattern is output, the user may erroneously recognize it. To prevent such a misrecognition, it is necessary to save an electric power consumption of the battery. For this purpose, the user repeatedly frequently turns on and off the power switch to thereby prevent a vain consumption of the battery power.

However, hitherto, the discrimination and execution of the on-off operations of the power switch as mentioned above are performed by the will of the user. Therefore, in such a kind of apparatus, not only is fatigue produced by tactile-read characters or the like but also fatigue due to the on-off operations of the power switch is further added. Thus, the erroneous tactile-reading increases and the tactile-reading operation for a long time will be impeded. In addition, since the user is blind, there is a drawback such that the user must search for the power switch. These drawbacks are set to the fifth problem.

SUMMARY OF THE INVENTION

For the first problem, it is an object of the present invention to provide a sensing display apparatus in which character data such as characters, symbols, or the like which are optically read is stored into a memory, the stored character data is further displayed by the sensing display device, thereby enabling the training to be simply performed by the user himself, and the conventional drawbacks can be eliminated.

In addition, by making it possible to select the conventional mode, memory mode according to the invention, and its reading mode, characters or the like by the sensing display can be more effectively sensed.

For the second problem, there is provided a sensing display apparatus having first conversion means for converting an optical image recorded in a recording medium into a first electric image signal and second conversion means for converting the electric image signal output from the first conversion means into a mechanical display output, wherein this sensing display apparatus further has selecting means for receiving both of the first electric image signal output from the first conversion means and the second electric image signal, for selecting either one of the first and second electric image signals by giving priority to the second electric image signal rather than the first electric image signal, and for inputting to the second conversion means.

With this constitution, the inconvenience such that the function of the overall apparatus stops even when a single section of the apparatus failed is eliminated and the function can be immediately recovered.

For the third problem, there is provided a pattern reading apparatus in which an influence by a micro fluctuation of a threshold voltage (reference voltage) is eliminated, thereby enabling the proper binarized data to be derived.

Namely, this object is accomplished by a pattern reading apparatus for binarizing an analog signal obtained by optical reading means and displaying by a sensing display device, wherein this apparatus has binarizing means which, when a reference level for binarization varies within a predetermined range, performs the binarization by use of the reference level which was set before it varies.

According to the present invention, therefore, when the threshold level to binarize a pattern read signal is set, there is provided means which ignores an influence on the threshold level by the micro fluctuation of the noise components or the like. With this means, even when a pattern of a low contrast such as a colored original document or the like is read, a clear pattern without a flicker can be displayed.

For the fourth problem, it is an object of the invention to provide an image converting apparatus which can be easily connected to an external input apparatus such as a personal computer or the like and at least the following three kinds of modes can be selected in the external input apparatus:

(1) a camera mode to display data from conventional image pickup means (camera) by a sensing display device;

(2) an image mode to convert an input electric data signal train into a two-dimensional data arrangement and to display by a sensing display device; and (3) a Braille mode to convert input data such as character codes or the like into Braille.

Another object of the invention is to provide an image converting apparatus having both a transfer function to directly output to an external apparatus vibration patterns displayed on the sensing display device in the three kinds of modes and an output function in which the vibration patterns can be received and displayed by the sensing display device.

To accomplish the above objects, an image converting apparatus according to the invention comprises: image reading means for reading optical image data such as characters, symbols, or the like and for converting into a two-dimensional pattern signal in accordance with a shape of data; signal input means for inputting a data signal including character codes and the two-dimensional pattern signal from an external apparatus; signal conversion means for converting the data signal input from the signal input means into a two-dimensional pattern signal in the mode designated by mode designating means; signal output means for transmitting to the outside the two-dimensional pattern signal which was output from the image reading means, signal input means, or signal conversion means; sensing display means for vibrating an array of transducers having a constant arrangement in response to the two-dimensional pattern signal output from the image reading means, signal input means, or signal conversion means; and control means for driving the image reading means, signal input means, and signal conversion means in accordance with the mode designated by the mode designating means. For this purpose, the invention has means for inputting data such as characters, symbols, graphics, or the like from the external apparatus and Braille pattern generating means. Therefore, the image data from the outside can be directly output or can be converted into a Braille pattern and output and displayed by the sensing display device.

Further, for the fifth problem, there is provided an image converting apparatus comprising: first conversion means for converting an optical image pattern formed on a recording medium into an electric signal; second conversion means for converting the electric signal output from the first conversion means into a mechanical vibration and for outputting as a predetermined pattern; and power source means for supplying an electric power to at least the second conversion means, wherein control means for controlling the electric power supply from the power source means is arranged near a predetermined pattern output portion of the second conversion means, thereby enabling to eliminate the foregoing troublesome discrimination and operations such that the turn-on and turn-off of the power switch are discriminated and the user searches for the position of the power switch and the like, so that the user can devote himself to tactile-read an image such as character or the like to accomplish the inherent object. With the above constitution, the electric power consumption at the time other than the tactile-reading operation is prevented and the life of the battery is prolonged.

BRIEF DESCRIPTION OF THE DRAWINGS

FIG. 10 is a schematic flowchart showing the operation of the invention;

FIGS. 18A to 18E are plan views showing examples of the output states of an image pattern in a tactile stimulator (sensing display device) in FIG. 17;

FIGS. 19A to 19D are plan views showing examples of the output states of a Braille pattern in the tactile stimulator in FIG. 17;

FIG. 21 is a timing chart showing timings for main output signals in FIG. 20;

FIG. 24 is a circuit block diagram of an image converting apparatus;

DETAILED DESCRIPTION OF THE INVENTION

The first constitution to solve the first problem will be first described.

Figure 1:
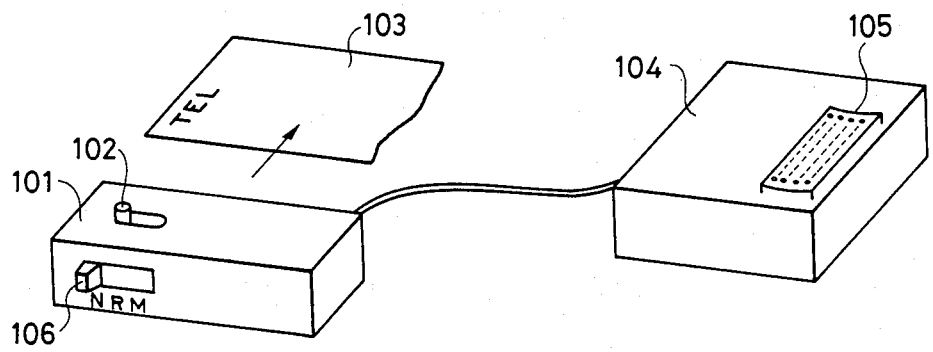
FIG. 1 is a schematic perspective view of an apparatus according to the present invention.
Figure 2:
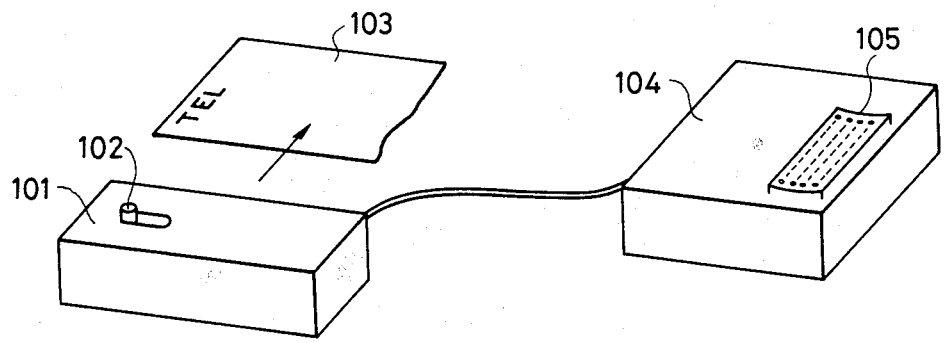
FIG. 2 is a schematic perspective view of a conventional reading apparatus for blind persons.

FIG. 1 is a schematic perspective view of an apparatus according to the present invention. Reference numeral 101 denotes the camera unit to optically read data such as characters, symbols, or the like and to convert into an electric signal; 102 is a zoom lever to optically enlarge the data such as characters or symbols; 103 a paper such as book, original document, or the like; 104 a main unit including a control unit to process the data such as characters, symbols, or the like which was read by the camera unit 101; 105 the tactile array consisting of (5×20) pins arranged in a matrix form for informing the data such as characters, symbols, or the like which was read by the camera unit 101 to a blind person by projecting and vibrating the pins in correspondence to the read data; and 106 a slide switch (selecting means) to change the mode.

First, when the slide switch 106 is moved from the position of a normal mode N to the position of a memory mode M, the electric signal of the character data obtained from the camera unit 101 is sequentially stored into a memory section in the main unit. When the slide switch 106 is returned to the normal mode N, the storage is finished.

For example, the slide switch 106 is set to the memory mode M, the camera unit 101 is scanned along characters "TEL" on the paper 103 (recording medium), and the slide switch 106 is returned to the normal mode N. Thus, the characters "TEL" are sequentially displayed on the tactile array 105 and at the same time, the character data of "TEL" is stored into the memory section.

The character data of "TEL" stored in the memory section is output therefrom by setting the slide switch 106 to a reading mode R, thereby vibrating the tactile array 105.

As described above, by once inputting character data from the camera unit 101, the input data is repeatedly displayed as a tactile output by the tactile array many times. Therefore, the instructor does not need to repeatedly perform the same operation many times but the blind person can train the reading operation of the character. Therefore, the works, burden, and the like of the instructor are lightened.

Figure 3:
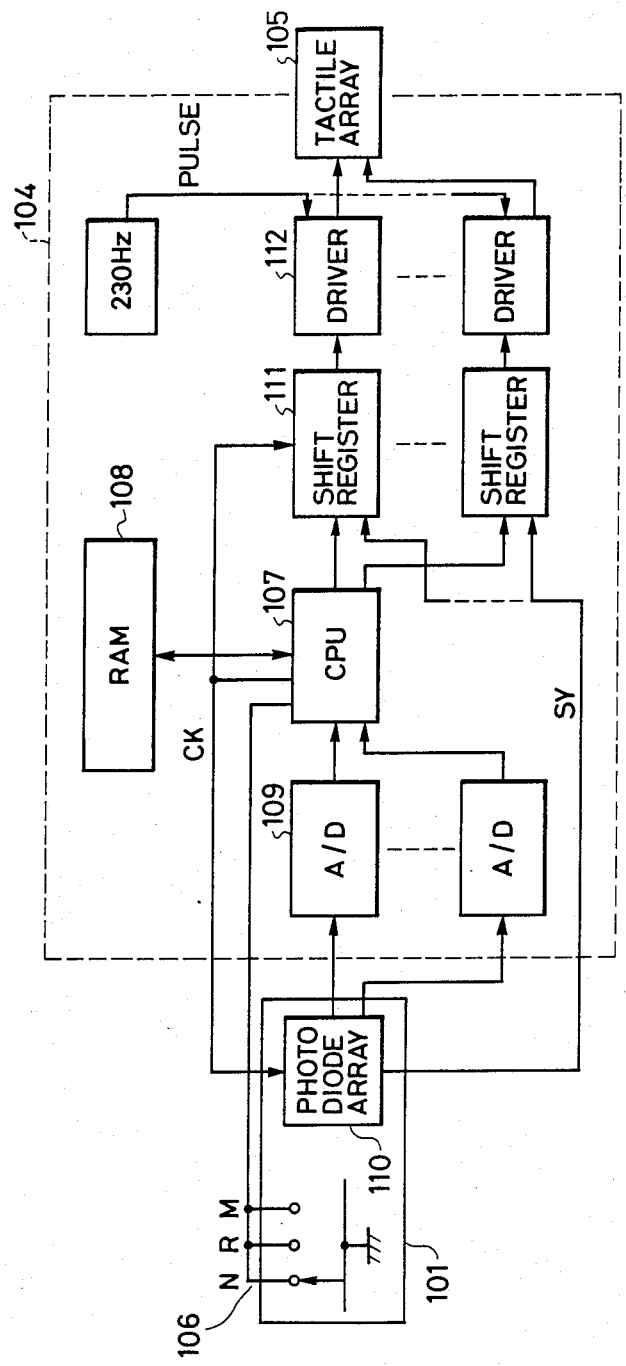
FIG. 3 is an electrical circuit block diagram showing a constitution of the invention.
Figure 4:
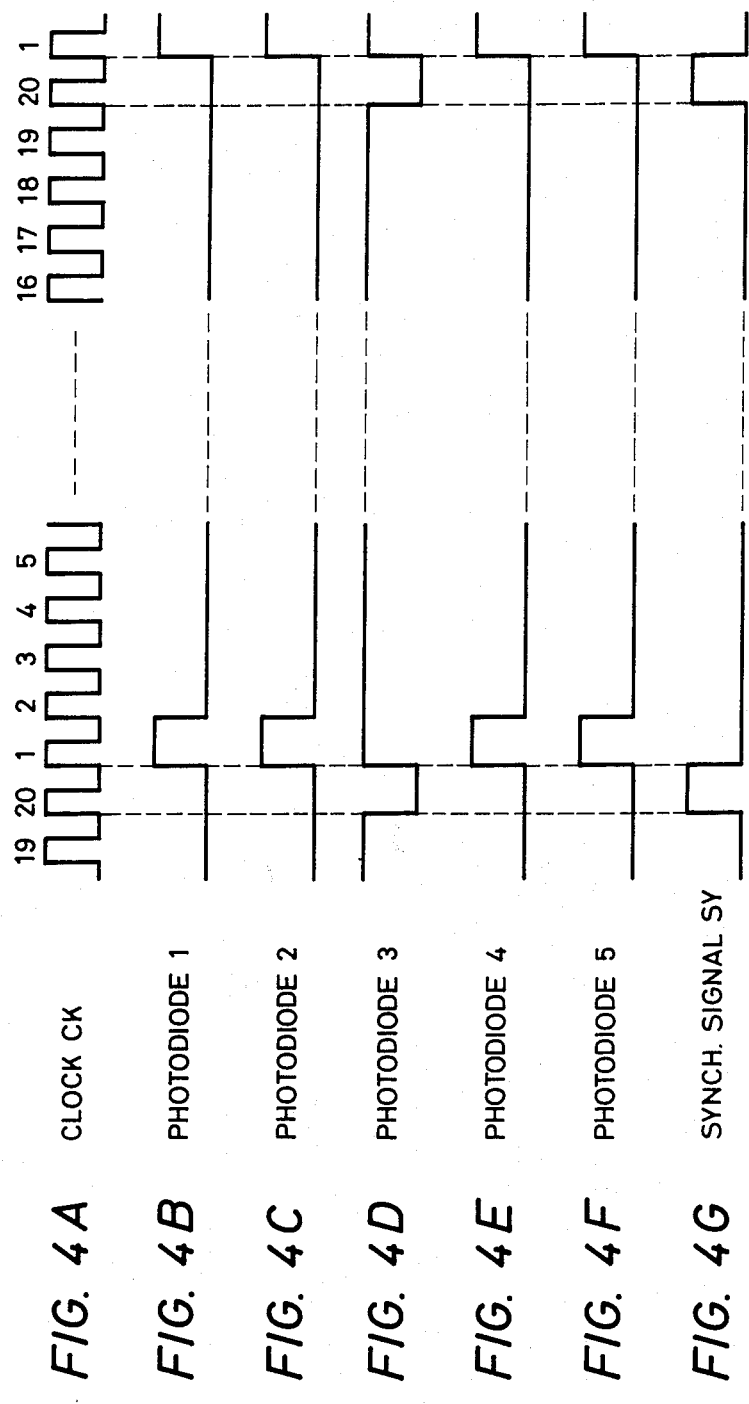
FIG. 4 is a timing chart of photodiodes and output signals.

FIG. 3 is a schematic block diagram to accomplish the invention. A CPU (central processing unit) 107 outputs a clock CK to a photodiode array 110 consisting of (5×20) photodiodes arranged in a matrix form and to a shift register 111. The photodiode array 110 outputs a voltage proportional to a light amount of each cross point to an A/D (analog/digital) converter 109 synchronously with the clock CK. The analog output signal is converted into the digital data by the A/D converter 109. When the value of the digital data is larger than or equal to a predetermined value, the CPU 107 outputs a high-level (H) signal to the shift register 111. When it is smaller than the predetermined value, the CPU 107 outputs a low-level (L) signal to the shift register 111. The photodiode array 110 outputs one sync signal SY each time twenty clocks CK are input.

For example, the relations among the clock CK when the camera unit 101 read the character "T", the digital data after the A/D conversion, and the sync signal SY are shown in FIGS. 4A to 4G, respectively.

In this manner, for example, the read data of the photodiode array 110 is sent from the CPU 107 to the shift register 111 synchronously with the clock CK. The shift register 111 receives the sync signal SY from the photodiode array 110 and sends the stored data to a driver 112 to drive the tactile array 105.

On the other hand, pulses of about 230 Hz to vibrate the tactile array 105 are input to the driver 112. An output of the driver 112 is controlled by the foregoing data.

When the slide switch 106 is set to the memory mode M, the digital data shown in FIGS. 4B to 4F is stored into an RAM (random access memory) 108 and this storing operation is continued until the mode is changed. When the slide switch 106 is set to the reading mode R, the CPU 107 stops generation of the clock CK to the photodiode array 110 and outputs the stored data from the RAM 108 to the shift register 111 synchronously with the clock CK. The tactile array 105 vibrates in accordance with the read data. When the slide switch 106 is returned to the normal mode N, the CPU 107 restarts sending the clock CK to the shift register 111. The operating mode is then returned to the normal mode N.

Figure 5:
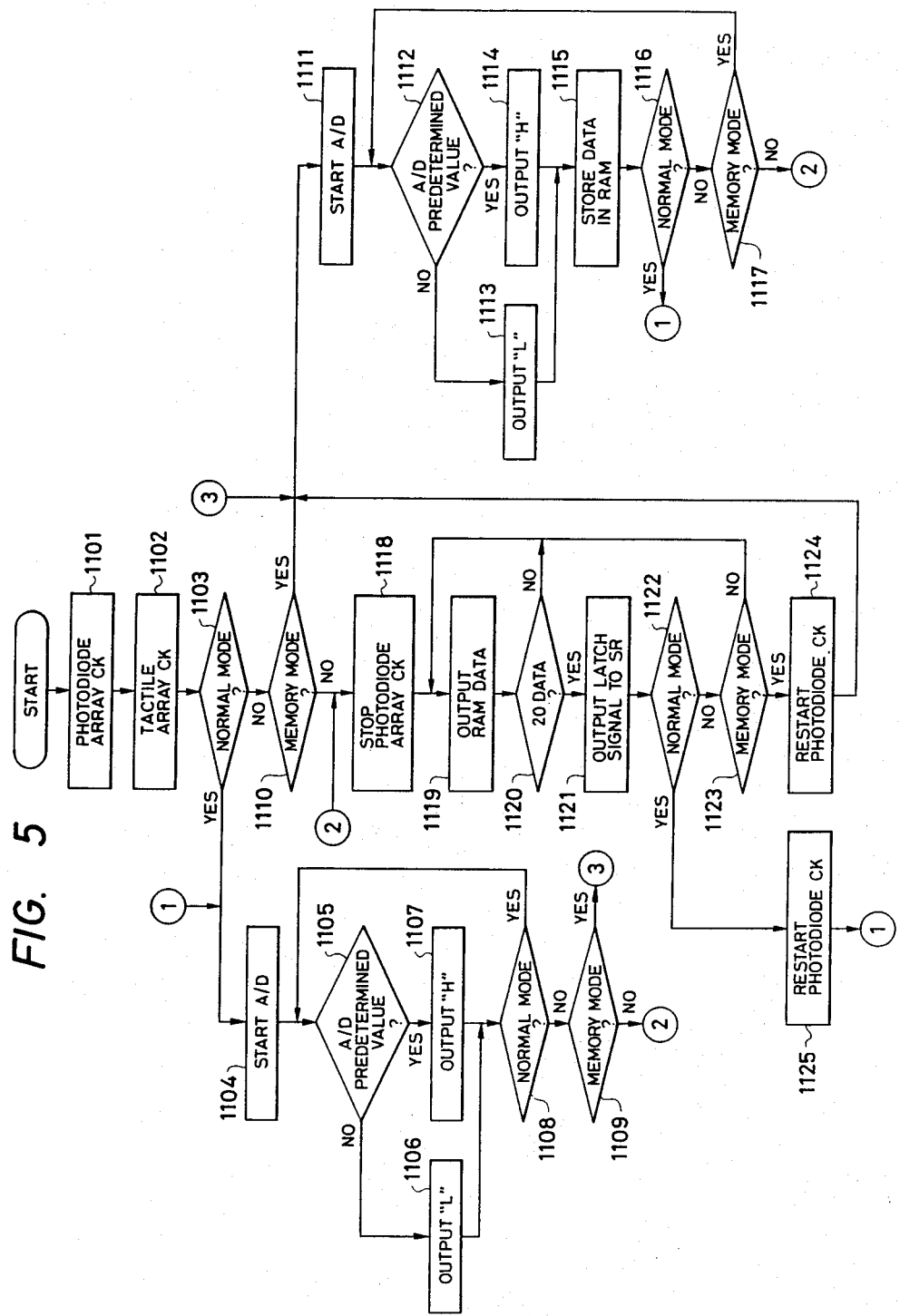
FIG. 5 is a schematic flowchart showing the operation of the invention.

FIG. 5 is a schematic flowchart to accomplish the invention.

In step 1101, by generating the necessary clocks CK to the photodiode array 110, the photodiode array 110 is made operative. Each time twenty clocks CK are input, the sync signal SY is output and is set to a latch signal of the shift register 111. The data stored in the shift register 111 is output to the driver 112. In step 1102, pulses of about 230 Hz are made to vibrate the tactile array 105 and output to the driver 112. In discriminating step 1103, a check is made to see if the slide switch 106 has been set to the normal mode N or not. If YES, the camera unit 101 reads a character, symbol, or the like and immediately vibrates the tactile array 105. In step 1104, the A/D conversion is started and the converted digital data is input. In discriminating step 1105, a check is made to see if the read data is above a predetermined value or not. If NO, namely, when the value of the digital data is smaller than the predetermined value, the "L" signal is output to the shift register in step 1106. If YES, the "H" signal is output to the shift register. In the next discriminating steps 1108 and 1109, a check is again made to see if the slide switch 106 has been set to the normal mode N, memory mode M, or reading mode R. If the slide switch has been set to the normal mode N, step 1105 follows and the processes in steps 1105 to 1109 are repeated. If the slide switch has been set to the memory mode M, step 1111 follows. If the slide switch has been set to the reading mode R, step 1118 follows. If it is decided in step 1110 that the slide switch 106 has been set to the memory mode M, in a manner similar to the normal mode N, the A/D conversion is started and the "H" or "L" signal is output to the shift register 111 on the basis of the value of the digital data in steps 1111 to 1114. Thereafter, the data is stored into the RAM 108 in step 1115. After the data is stored in the RAM 108, the set mode of the slide switch 106 is discriminated in steps 1116 and 1117. If the slide switch has been set to the memory mode M, the processes in steps 1112 to 1117 are repeated. The data from the camera unit 101 is continuously stored into the RAM 108. In discriminating step 1116, if the slide switch has been set to the normal mode N, step 1104 follows. If the slide switch has been set to the reading mode R in step 1117, step 1118 follows.

If the slide switch 106 has been set to the reading mode R in step 1110, the generation of the clock CK to the photodiode array 110 is stopped in step 1118. The data stored in the RAM 108 is output to the shift register 111 in step 1119. In step 1120, a check is made to see if twenty data have been output from the RAM 108 or not. After twenty data have been output from the RAM 108 in steps 1119 and 1120, a latch signal is output to the shift register 111 in step 1121. In response to this latch signal, the data which had been output from the RAM 108 and is stored in the shift register 111 is supplied to the driver 112, so that the tactile array 105 vibrates. In steps 1122 and 1123, the set mode of the slide switch 106 is discriminated. If it has been set to the reading mode R, the processes in steps 1119 to 1123 are repeated and the tactile array 105 is vibrated. If the slide switch has been set to the normal mode N in step 1122, the generation of the clock CK to the photodiode array 110 is restarted in step 1125. The processing routine is returned to step 1104 and the normal mode N is set. If the slide switch has been set to the memory mode M in step 1123, the generation of the clock CK to the photodiode array 110 is restarted in step 1124. Then, step 1111 follows and the memory mode M is set.

Although the embodiment of the invention has been described with respect to an example in which the RAM has been used as a memory section, a floppy disk or the like can be also used in place of the RAM.

By previously storing the data by an instructor, a blind person can also train by himself if the instructor is absent.

As described in detail above, in the conventional well-known reading apparatus for blind persons, a very long time and a large burden are required for not only the blind person but also the instructor in the case of training. However, according to the present invention, by providing means for storing character data and means for outputting the stored character data, the character data which has once been stored can be used for training many times by a blind person without assistance of the instructor. Therefore, this reading apparatus can be used as a more useful reading apparatus for blind persons.

The second constitution to solve the second problem will now be described.

Figure 6:
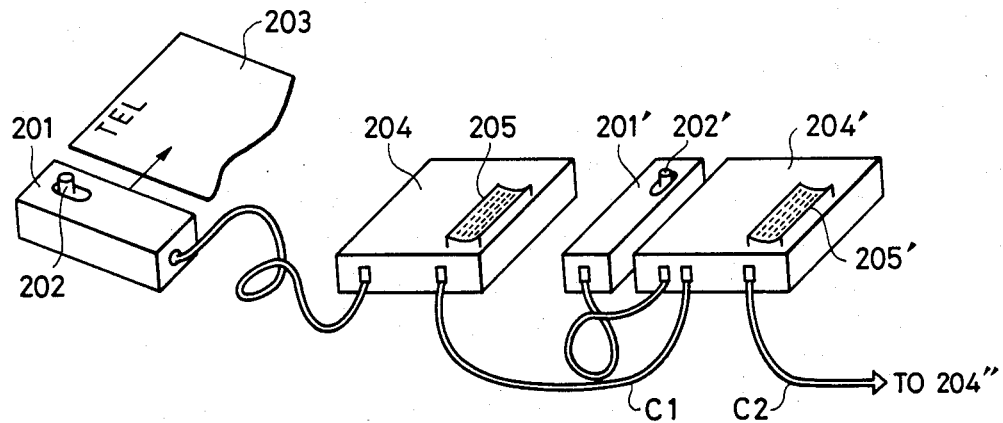
FIG. 6 is a perspective view showing a constitution according to the invention.

FIG. 6 is a perspective view showing a constitution of an apparatus according to the invention. Reference numerals 201 and 201' denote the camera units for optically reading data such as characters, symbols, or the like and for converting the data into electric signals; 202 and 202' are zoom levers to optically enlarge the character or symbol data; 203 the printed matter such as a book, original document, or the like; 204 and 204' the main units including control units to process the data such as characters, symbols, or the like which were read by the camera units 201 and 201', respectively; and 205 and 205' the tactile stimulators consisting of (5×20) pins arranged in a matrix form for informing the blind person the data such as characters, symbols, or the like which were read by the camera units 201 and 201' by projecting and vibrating the pins, respectively. In FIG. 6, when the camera unit 201 is scanned along the characters "TEL" on the printed matter 203 (recording medium) in the direction indicated by an arrow, the image data of the characters of "T", "E", and "L" which were read by the camera unit 201 are sequentially output and displayed as vibration patterns by the tactile stimulator 205. Namely, when the camera unit 201 is located on the character "T" on the printed matter 203, the pins of the tactile stimulator 205 vibrate as a form of "T". The blind person feels these vibrations by the finger tip, thereby recognizing the character "T". Further, the image data is output through an interface (not shown) provided in the main unit 204 and through a connecting cord $C_1$ and input to the second main unit 204'. In response to this input data, the second tactile stimulator 205' similarly vibrates as a form of "T". In this manner, data can be simultaneously transferred to a plurality of blind persons. However, there is a case where no image data signal is input to the second main unit 204' due to a cause such as, e.g., disconnection of the connecting cord $C_1$, failure of the camera unit 201 or main unit 204, or the like. In such a case, the second main unit 204' detects the stop of image data signal which is input via the connecting cord $C_1$ and starts a timer provided in the second main unit 204'. When the non-signal state has continued for a predetermined period of time and the timeover has come, the input path is switched so that the camera unit 201' can be used. Due to this, the second main unit 204' can subsequently input image data such as characters or the like from the printed matter 203 by use of the camera unit 201'. For the disconnection of the connecting cord $C_1$ and the failure of the camera unit 201 or main unit 204, it is sufficient to request to repair them. In the case of simple failures, they will be repaired in a short time. After completion of the repair, the second main unit 204' again inputs an image data signal via the correcting cord $C_1$. In this state, the second main unit 204' receives the image data signal from both the connecting cord $C_1$ and the camera unit 201'. However, since priority is given to the image data signal which was input from the cord $C_1$, the input path is again switched, thereby enabling the camera unit 201 to be used. The foregoing switching of the input path is automatically performed on the basis of the decision of a computer provided in the main unit second 204' by detecting whether the image data signal has been input via the connecting cord $C_1$ or not. Therefore, the apparatus can be continuously used without waiting until the failure is repaired.

Figure 8:
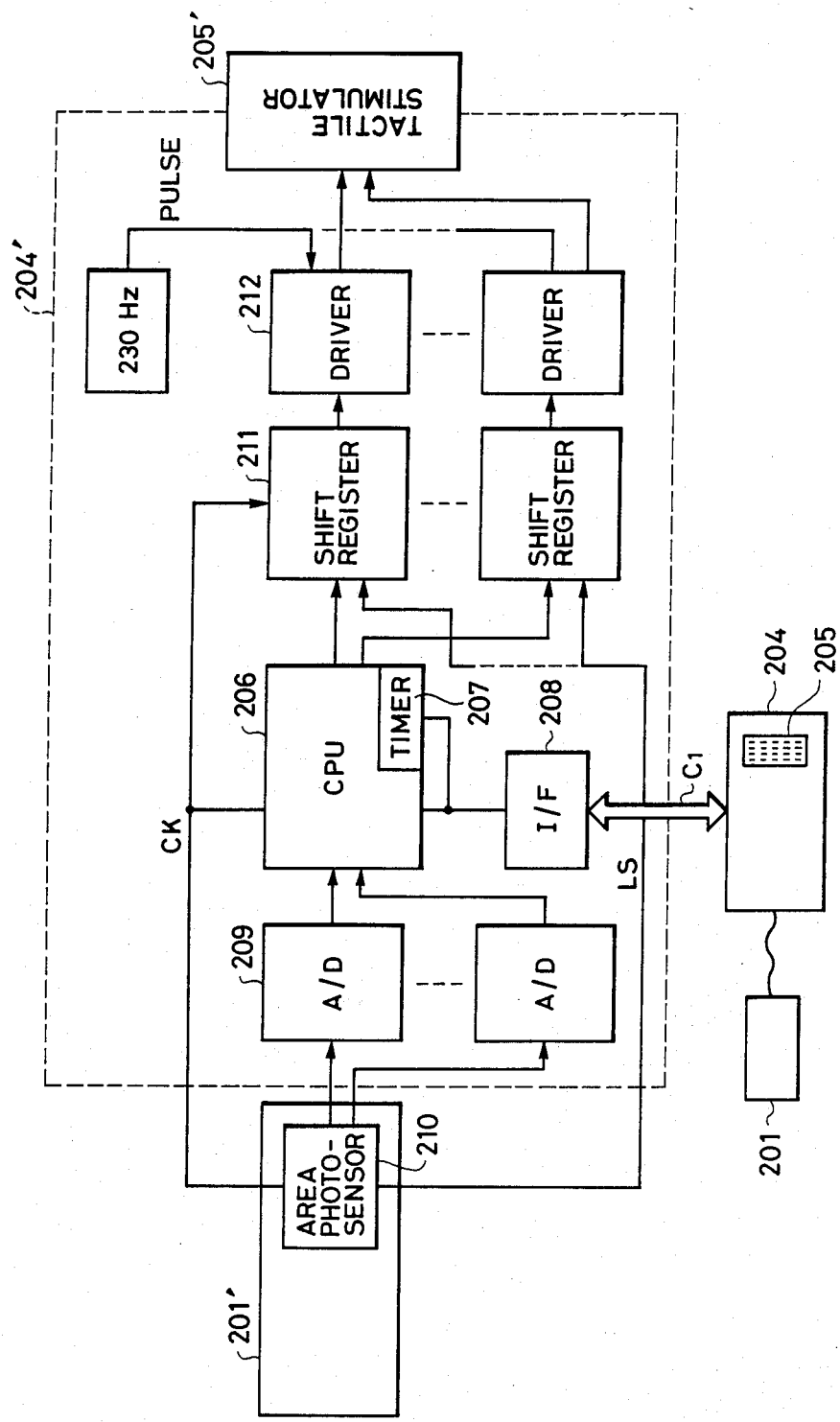
FIG. 8 is an electrical circuit block diagram which is applied to an embodiment of the invention.
Figure 9:
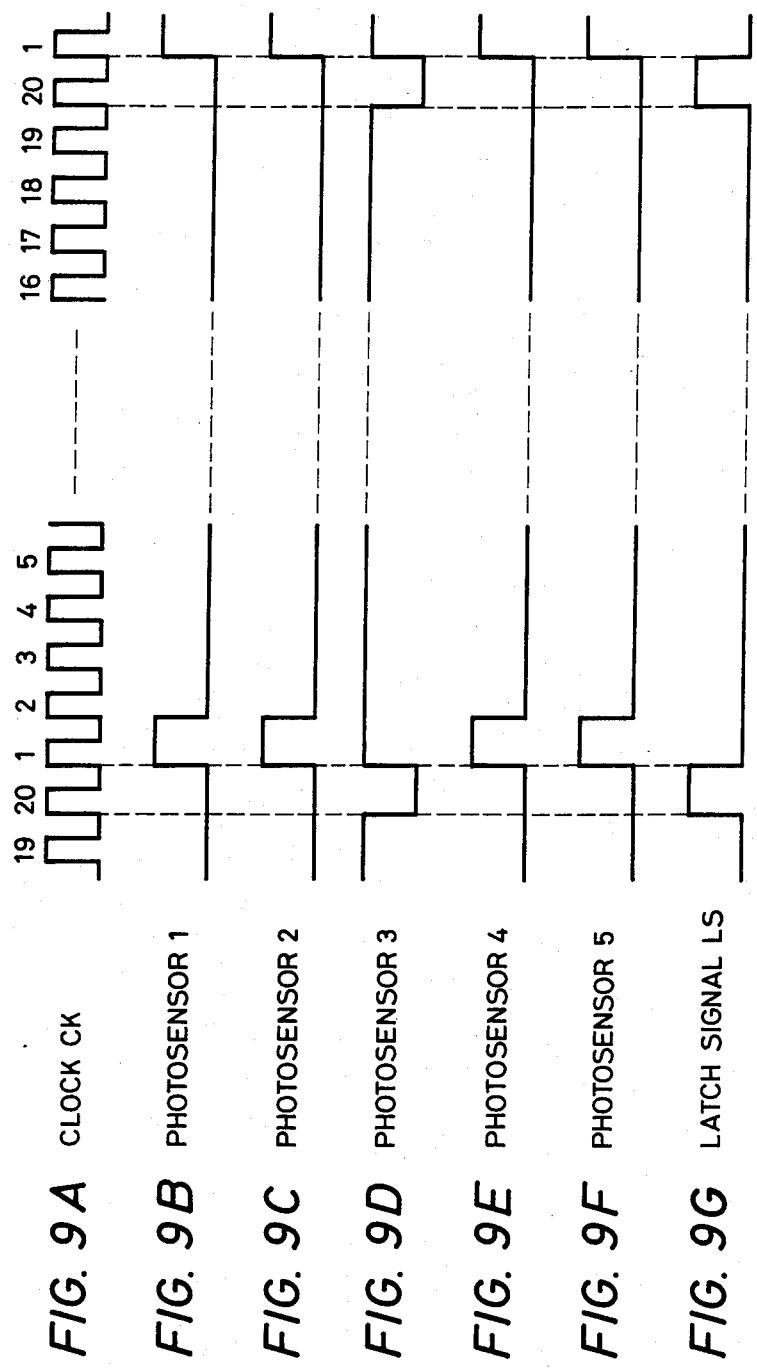
FIG. 9 is a timing chart of area photosensors and output signals.

FIG. 8 is an electrical circuit block diagram to accomplish the invention. A CPU (central processing unit) 206 outputs a clock CK to an area photosensor 210 consisting of (5×20) photosensors arranged in a matrix form and to a shift register 211. The area photosensor 210 outputs a voltage proportional to an amount of light at each cross point to an A/D (analog/digital) converter 209 synchronously with the clock CK. This analog output signal is converted into the digital data by the A/D converter 209. When the value of the digital data is larger than or equal to a predetermined value, the CPU 206 outputs the "H" signal to the shift register 211. When it is smaller than the predetermined value, the CPU 206 outputs the "L" signal to the shift register 211. Each time twenty clocks CK are input, the area photosensor 210 outputs one latch signal LS to the shift register 211.

For example, the relations among the clock CK when the camera unit 201' read the character "T", the digital data after the A/D conversion, and the latch signal LS are shown in FIGS. 9A to 9G, respectively.

In this manner, the read data of the area photosensor 210, for example, is sent from the CPU 206 to the shift register 211 synchronously with the clock CK. When the shift register 211 receives the latch signal LS from the area photosensor 210, the data stored in the shift register 211 is supplied to a driver 212 to drive the tactile stimulator 205'.

On the other hand, pulses of about 230 Hz to vibrate the tactile stimulator 205' are input to the driver 212. An output of the driver 212 is controlled on the basis of the input data.

In FIG. 8, the image data which was output from the camera unit 201 and main unit 204 is input to an interface 208 through the connecting cord $C_1$. The image data input to the main unit 204' resets a timer 207 in the CPU 206 by interruption each time the image data is input. The image data is supplied to the tactile stimulator 205'. However, if no image data signal is input via the connecting cord $C_1$ for some reasons, the non-image signal state is detected and the timer 207 is started. When the non-signal state has continued for a time longer than a predetermined time set in the timer 207, the timer 207 outputs a timeover signal to thereby switch the input path to the side of the camera unit 201'. However, when an image data signal is again input to the interface 208, the timer 207 in the CPU 206 is reset by this interruption and the operating mode is returned to the state which has already been described. Namely, the image data output from the camera unit 201 and main unit 204 are input to the main unit 204' via the cord $C_1$ and supplied to the tactile stimulator 205'.

FIG. 10 is a schematic flowchart to accomplish the invention. In step 2101 in FIG. 10, pulses of about 230 Hz to vibrate the tactile stimulator 205' in FIG. 8 are made and output to the driver 212. Next, in step 2102, a clock CK for the area photosensor 210 in FIG. 8 is output. The image data is input to the A/D converter 209 synchronously with the clock CK and A/D converted in step 2103. In step 2104, the A/D converted digital data is read. In step 2105, a check is made to see if the value of the digital data is larger than or equal to a predetermined value or not. In steps 2106 and 2107, the "L" or "H" signal is output to the shift register 211 synchronously with the clock CK for the shift register 211. After the "L" or "H" signal is output to the shift register, step 2102 follows and the clock CK for the area photosensor 210 is again output. In this manner, the processes in steps 2102 to 2107 are repeated. After twenty clocks CK were input to the area photosensor 210, the latch signal LS is output. The data in the shift register 211 is sent to the driver 212, thereby vibrating the tactile stimulator 205'. These operations are executed in the mode to input the signal from the camera unit 201'.

When the image data signal is input from the main unit 204 through the interface 208 for this interval, the CPU 206 generates an interruption signal and the processing routine advances to step ①. The CPU 206 resets the timer 207 and starts the timing operation of the timer 207 in step 2108. In step 2109, the image data signal is read from the main unit 204. In step 2110, the read image data signal is output to the shift register 211 synchronously with the clock CK for the shift register 211. In step 2111, a check is made to see if twenty clocks CK have been input or not. If YES, the latch signal LS is output to the shift register 211 in step 2112. In response to the latch signal LS, the image data is sent to the driver 212, thereby vibrating the tactile stimulator 205' by the pulses of about 230 Hz.

In step 2113, a check is made to see if an overflow has occurred in the timer 207 in the CPU 206 or not. When image data is continuously input from the main unit 204, the timer 207 does not overflow. Therefore, the processing routine advances to step ① by the interruption and the apparatus is held in the mode to input image data from the main unit 204. On the other hand, if no image data is input from the main unit 204 within a predetermined time after the timing operation of the timer 207 was started, an overflow occurs in the timer 207. Thus, step ② follows and the apparatus is reset to the mode to input a signal from the camera unit 201'.

In the embodiment shown in FIGS. 6 and 8, an example in which two main units 204 and 204' are connected has been described. Further, a plurality of main units 204", ... can be also connected and used. In the case of switching from the main unit 204 to the camera unit 201' in order to input the image data signal to the main unit 204', and in the opposite case, it is also possible to generate an alarm sound to thereby inform the switching of the input. Further, the switching timing of the input can be freely set by changing a set value of the timer.

As mentioned above, in the invention, when a plurality of sensing display apparatuses are connected and used, it is possible to eliminate the conventional drawback such that if a failure occurred in at least one of the connecting cord, camera unit, and main unit, the function of the whole apparatus connected to the defective part stops. When the failure is detected, the input path is automatically changed, so that the normal apparatus section can be subsequently used. Therefore, trouble caused by the failure can be reduced as much as possible.

Further, after the failure is repaired, the operating mode is automatically reset to the original input mode. Therefore, the invention is very useful.

The third constitution to solve the third problem will now be described.

Figure 11:
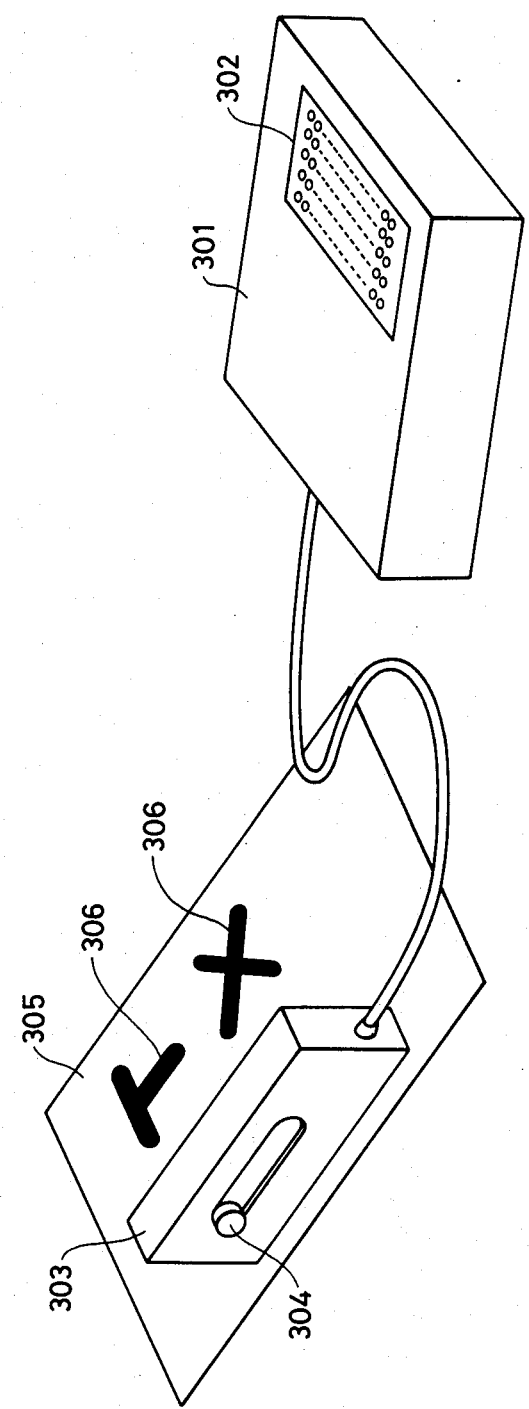
FIG. 11 is a schematic perspective view of an embodiment to which the invention is applied.

FIG. 11 is a schematic perspective view showing the whole portion of an embodiment of a pattern reading apparatus to which the invention is applied. In the diagram, reference numeral 301 denotes a main unit; 302 is a display unit to display a read pattern; 303 a camera unit for optically reading patterns such as characters, symbols, graphics, or the like, for converting into electric signals, and for outputting; and 304 a threshold voltage adjustor lever to set a threshold voltage to separate the read image signal obtained from the camera unit 303 into the binarization data indicative of the light portion and dark portion. Numeral 305 denotes a whole original document to be image-picked up; and 306 indicates reading patterns such as characters, symbols, graphics, or the like written on the original document 305.

Figure 12:
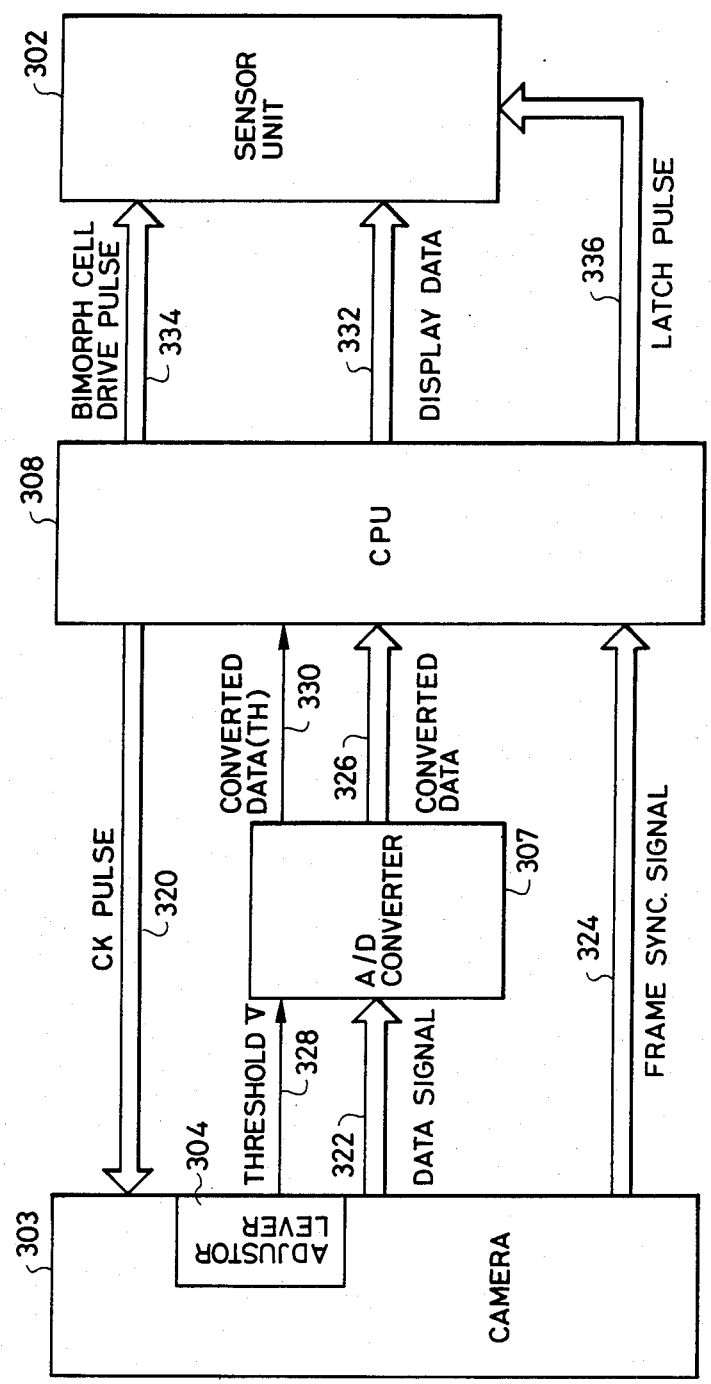
FIG. 12 is a block diagram showing an electrical constitution of the embodiment.

FIG. 12 is a block diagram showing an electrical constitution of the invention. The camera unit 303 shown in the diagram consists of an optical system mechanism and an area photosensor (both are not shown). Each time a clock pulse 320 is input from a CPU 308, the camera unit 303 reads pattern data one line by one and outputs a data signal 322. After the camera unit 303 finished reading image data of one frame, it outputs a frame sync signal 324 to the CPU 308.

The data signal 322 sent from the camera unit 303 is converted into digital data 326 of eight bits by an A/D converter 307.

Similarly, a signal 328 to designate the threshold voltage is output from the threshold voltage adjustor lever 304 and converted into digital data (TH) 330 of eight bits by the A/D converter 307. The digital data 330 is used as the threshold level when the converted data 326 is binarized.

The CPU 308 compares the converted data 326 with the data 330 (threshold level). When the converted data 326 is smaller than the data 330, the CPU 308 decides that the read image data corresponds to the light portion. On the contrary, when the converted data 326 is larger than the threshold level, the CPU 308 determines that the read image data corresponds to the dark portion. Then, the CPU 308 outputs display data 332 of the "H" or "L" level corresponding to the light or dark portion to the sensing unit 302. On the other hand, the CPU 308 always outputs pulses 334 of about 230 Hz to drive the Bimorph cells to the sensing unit 302.

When the frame sync signal 324 sent from the camera unit 303 is input to the CPU 308, the CPU 308 outputs a latch pulse 336 to the sensing unit 302. Thus, the display data 332 is displayed as a vibration pattern of the Bimorph cells.

In this manner, the same pattern as the pattern read by the camera unit 303 is vibration displayed by the sensing unit 302, so that the user can read the pattern 306 as a tactile image.

Figure 13:
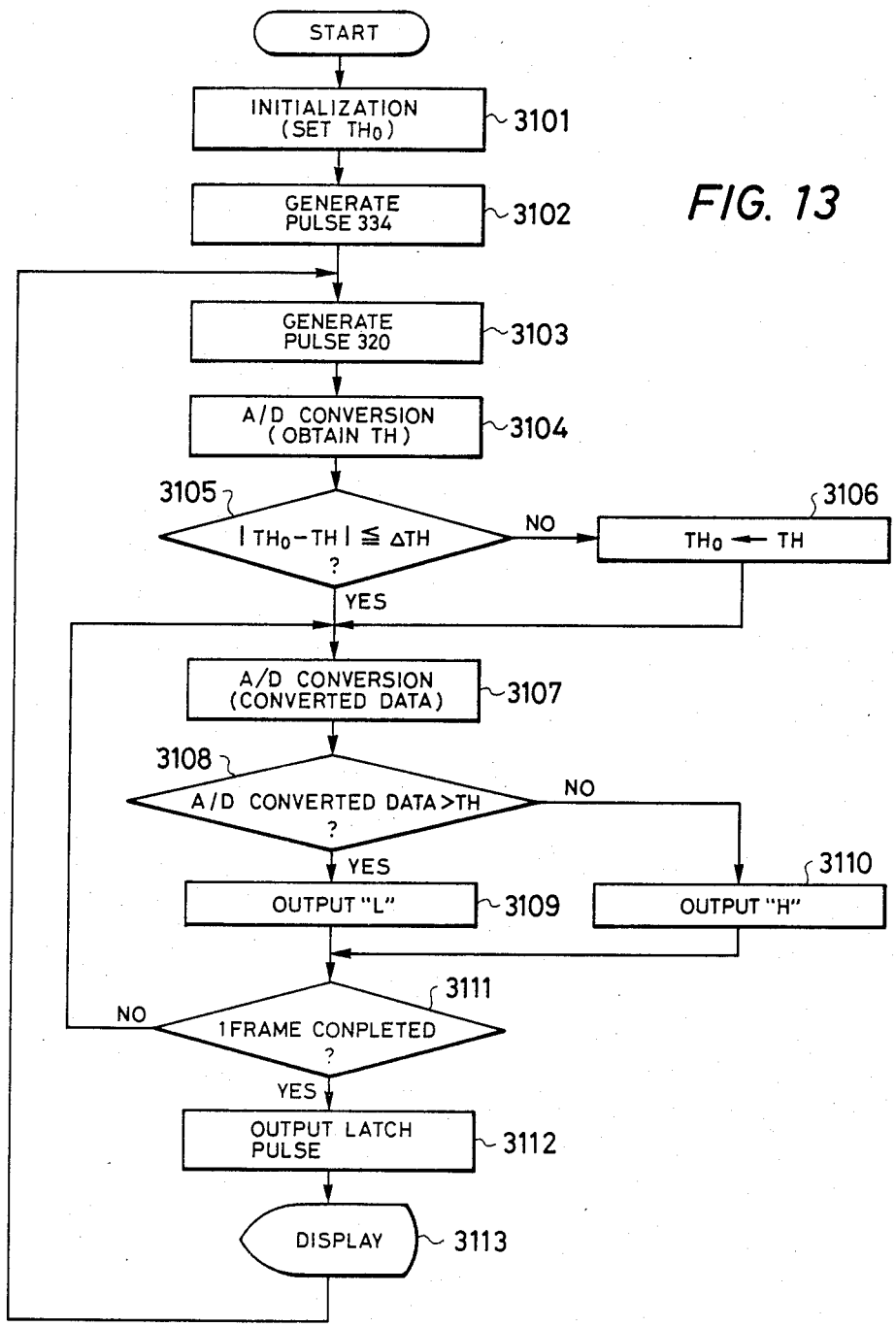
FIG. 13 is a flowchart showing an operation procedure of the embodiment.

FIG. 13 is a flowchart showing the operation of the embodiment. After the apparatus was actuated, each section is first initialized in step 3101. At this time, the threshold level $TH_0$ is initialized.

In step 3102, the pulses 334 of about 230 Hz to drive the Bimorph cells are produced and output to the sensing unit 302.

In step 3103, a clock pulse 320 for the area photosensor is produced and output to the camera unit 303.

In step 3104, the voltage adjusted by the threshold voltage adjustor lever is A/D converted to obtain the converted value TH.

In step 3105, the converted value TH is compared with the initial value $TH_0$ of the threshold level. When the difference between them, i.e., the change amount is smaller than or equal to the permitted value $|\Delta TH|$, it is decided that the level fluctuation by the noise component occurred, and step 3107 follows.

On the other hand, when the change amount is larger than the permitted value $|\Delta TH|$, it is determined that the threshold level was adjusted (reset) and step 3106 follows. In step 3106, the converted value TH is newly set to the threshold level $TH_0$ and step 3107 follows.

In step 3107, the data signal 322 output from the camera unit 303 is A/D converted to obtain the converted digital data.

In step 3108, the converted data obtained in step 3107 is compared with the threshold level $TH_0$. When the converted data is larger than the threshold level, it is decided that the image data is the dark portion data, and step 3109 follows. On the contrary, when the converted data is smaller than the threshold level, it is decided that the image data is the light portion data, and step 3110 follows.

In step 3109, the display signal of the "L" level is output to the sensing unit 302. In step 3110, the display signal of the "H" level is output to the sensing unit 302.

In step 3111, a check is made to see if the pattern data of one frame has been completely read or not by discriminating whether the frame sync signal 324 has been input from the camera unit 303 to the CPU 308 or not. If NO, step 3107 follows and the pattern data is continuously read.

On the other hand, if the pattern data of one frame has been read, the frame sync signal 324 is input from the camera unit 303 to the CPU 308. In step 3112, a latch pulse is output from the CPU 308 to the sensing unit 302. Further, in step 3113, the CPU 308 displays the same pattern as the read pattern as a vibration pattern by use of the Bimorph cells. Then, step 3103 follows and the pattern data of the next frame is read.

Namely, the necessity of the adjustment of the threshold level is discriminated every frame by the routine in step 3105 and subsequent steps. If it is necessary to adjust the threshold level, it is reset. Thus, the fluctuation of threshold level by the influence of the noise component or the like can be eliminated.

Figure 14:
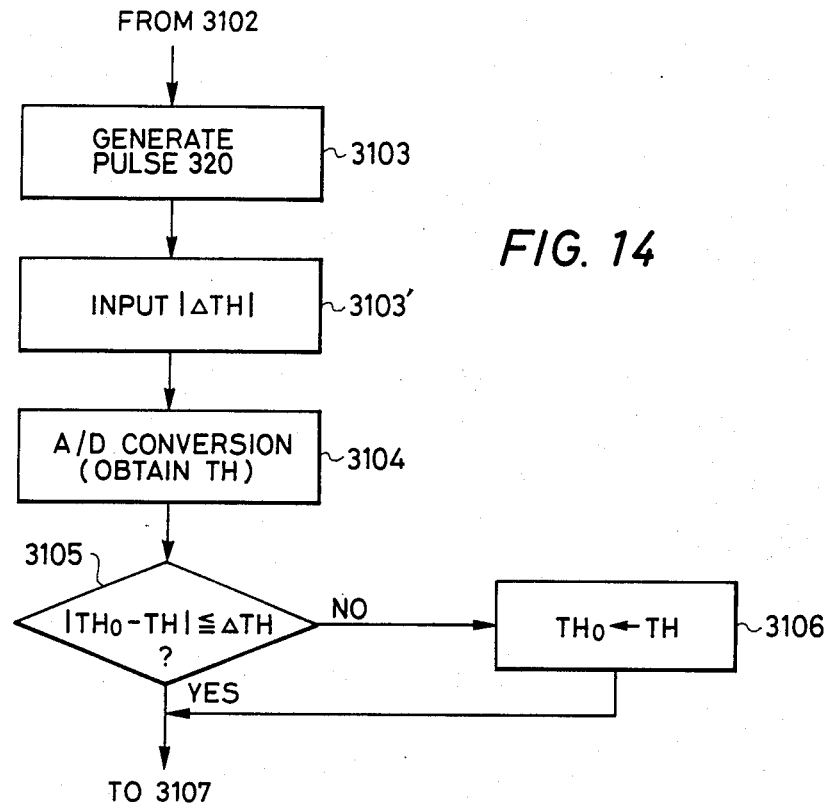
FIG. 14 is a flowchart showing a procedure obtained by improving a part of the procedure shown in FIG. 13.

FIG. 14 is a flowchart showing another processing procedure different from that shown in FIG. 13. The flowchart shown in FIG. 14 intends to variably set the permitted change value $|\Delta TH|$ of the threshold level. Namely, new step 3103' is added. By pressing a key (not shown), the value of the permitted change amount $|\Delta TH|$ is input to the CPU 308. Thus, when determining the necessity of the adjustment of the threshold level which is performed in discriminating step 3105, the permitted change amount $|\Delta TH|$ to eliminate the influence of the noise component or the like can be set to the optimum value.

Figure 15:
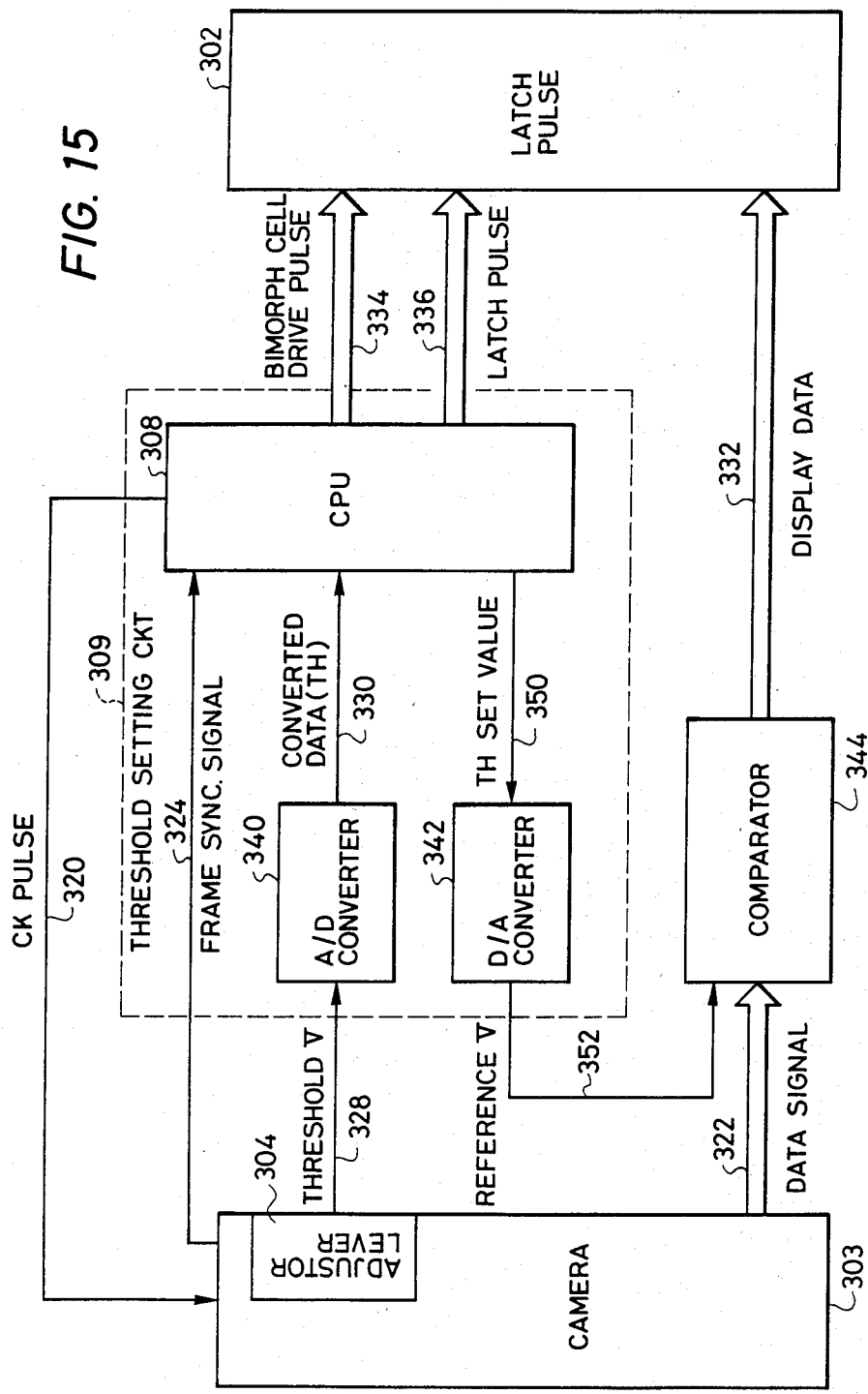
FIG. 15 is a block diagram showing another embodiment of the invention.

FIG. 15 is a block diagram showing the whole portion of another embodiment of the invention. This embodiment differs from the embodiment shown in FIG. 12 with respect to that there are newly provided: an A/D converter 340 to digitize only the threshold voltage 328; a D/A converter 342 to again convert the threshold level data sent from the CPU 308 to the analog voltage; and a comparator 344, wherein the binarizing process is performed by the hardware. Therefore, in FIG. 15, the same parts and components as those shown in FIG. 12 are designated by the same reference numerals.

In the embodiment shown in FIG. 15, a threshold level setting circuit is constituted by the A/D converter 340, D/A converter 342, and CPU 308. The setting circuit 309 keeps the threshold level stable by the processes corresponding to those in steps 3103 to 3106 shown in FIG. 13 and sends a threshold level data 350. The set threshold level is again D/A converted and a reference voltage 352 is generated. The reference voltage 352 is compared with the pattern data signal 322 by the comparator 344, thereby directly obtaining the display data 322. With this constitution, steps 3107 to 3110 shown in FIG. 13 can be omitted, so that the binarizing process can be performed at a high speed.

In the foregoing two embodiments, the threshold voltage adjustor lever 304 has been provided in the camera unit 303. However, the lever may be also set on the side of the main unit 301. On the other hand, a rotary knob may be also used in place of the lever.

As described above, in the invention, when the threshold level (reference level) is set, the influences by the noise component or by the fluctuations in power source voltage and the like are ignored. Therefore, it is possible to lighten the difficulty in setting the threshold level which is caused when a pattern of a low contrast such as a pattern formed on a colored original document is read. Such a difficulty causes a problem in the conventional reading apparatus for blind persons or the like. The flickering of the display pattern is eliminated. Thus, a clear display pattern can be obtained.

The fourth constitution to solve the fourth problem will now be described.

Figure 16:
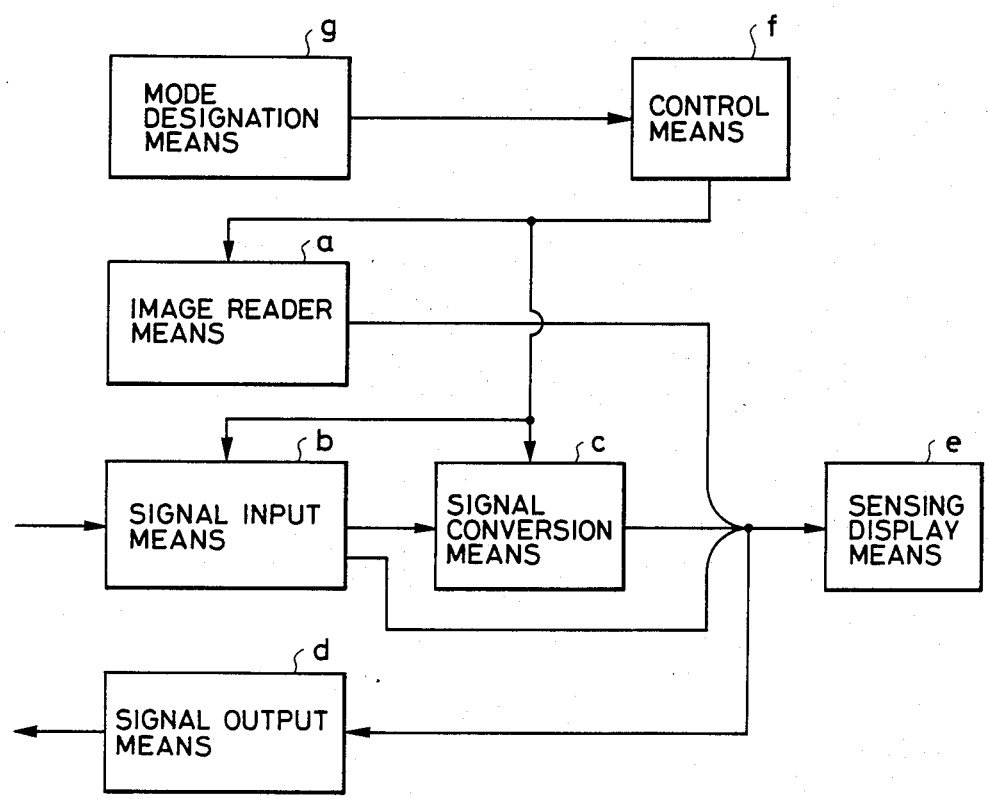
FIG. 16 is a block diagram showing a fundamental constitution of the embodiment of the invention.

FIG. 16 shows a fundamental constitution of the embodiment of the invention.

In the diagram, reference character a denotes image reader means for reading optical image data such as characters, symbols, or the like and for converting into a two-dimensional pattern signal in accordance with the shape of data;

b denotes signal input means for inputting a data signal including a character code from an external apparatus and a two-dimensional pattern signal;

c indicates signal conversion means for converting the data signal input from the signal input means b into the two-dimensional pattern signal in the mode designated by mode designation means g;

d represents signal output means for sending to the outside the two-dimensional pattern signal output from the image reader means a, signal input means b, or signal conversion means c;

e denotes sensing display means for vibrating an arrow of transducers of a constant arrangement in accordance with the two-dimensional pattern signal output from the image reader means a, signal input means b, or signal conversion means c;

f denotes control means for driving the image reader means a, signal input means b, and signal conversion means c in accordance with the mode designated by the mode designation means g.

Figure 17:
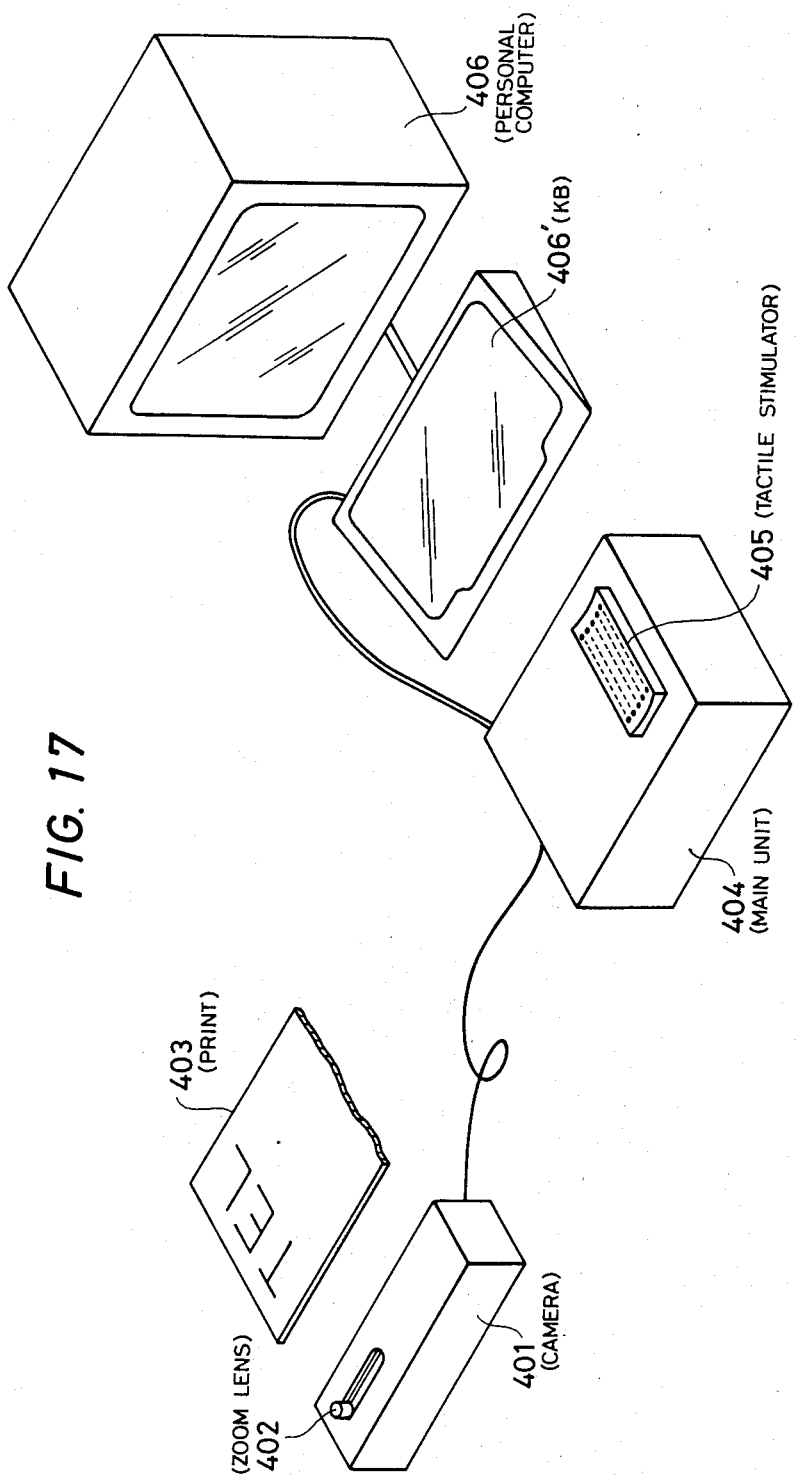
FIG. 17 is a perspective view showing an external view of the embodiment of the invention.
Figure 20:
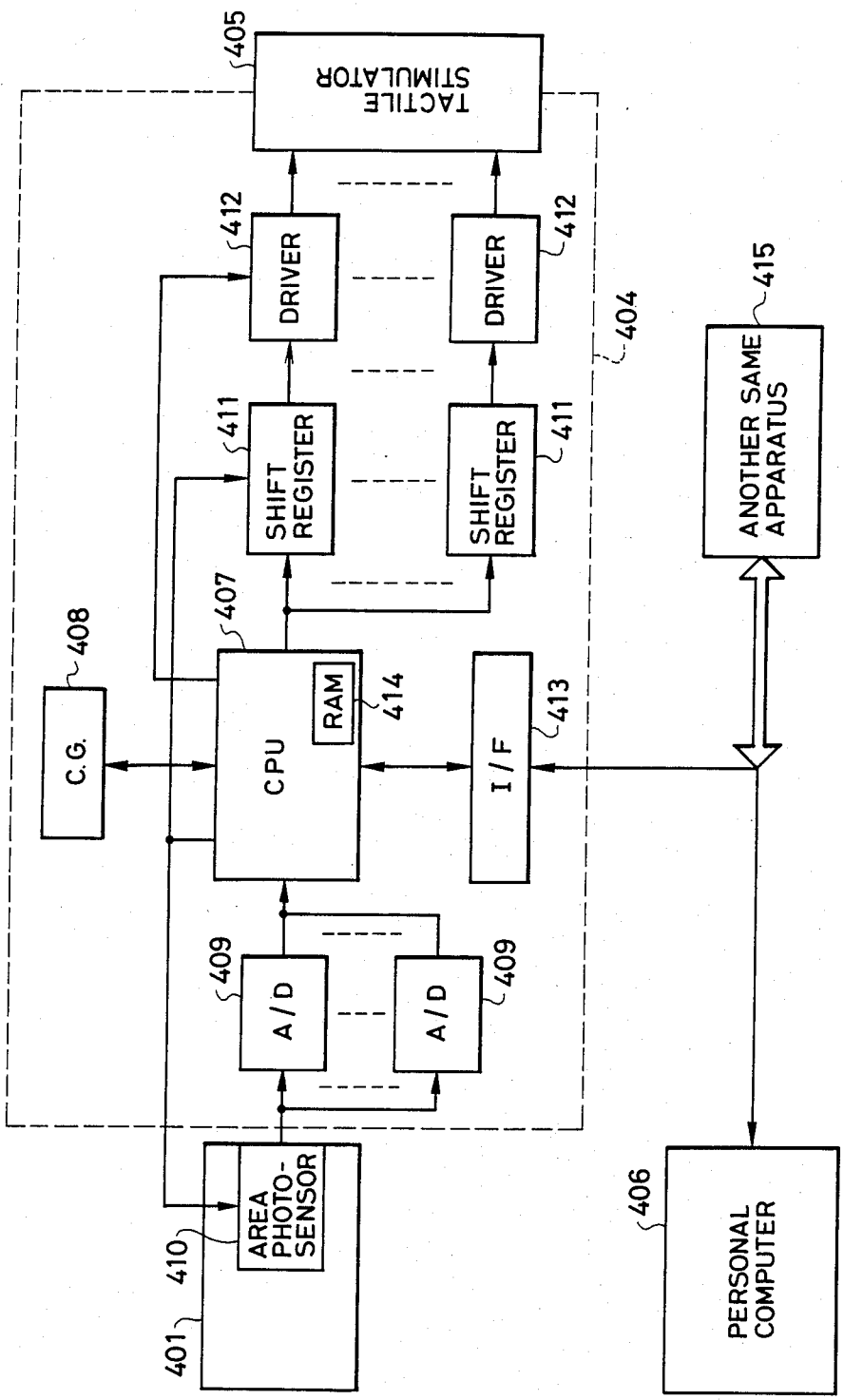
FIG. 20 is a block diagram showing a circuit constitution of the embodiment of the invention shown in FIG. 17.

FIG. 17 shows an external view of an image conversion apparatus in the embodiment of the invention. In FIG. 17, reference numeral 401 denotes a camera as image reader means for reading an optical image such as characters, symbols, photograph images, etc., and 402 is a zoom lens of the camera 401. By adjusting the position with a finger tip, the input image can be enlarged or reduced. Numeral 403 is a printed matter such as book, newspaper, or the like on which characters, symbols, or the like to be read are printed; 404 indicates a main unit having an electrical system as shown in FIG. 20; 405 a Bimorph type tactile stimulator as a sensing display device arranged on the main unit 404; and 406 a personal computer as an external input apparatus which is connected to the main unit 404.

In this embodiment, the operating mode is switched by inputting a key of a keyboard 406' of the personal computer 406. In the ordinary case, when the camera 401 is moved on the printed matter 403, the shape of image data (character, symbol) which was read by the camera 401 is displayed on the tactile stimulator 405 as a vibration pattern. The tactile stimulator 405 consists of a plurality of (e.g., 5×20) vibration pins arranged in a matrix form. For example, when the camera 401 is located on a character "T" on the printed matter 403, the pins at the positions corresponding to the character "T" in the tactile stimulator 405 vibrate. An eyesight handicapped person such as a blind person or a person with poor eyesight senses the vibration pattern by the finger tips thereby recognizing the character "T".

The main unit 404 of the image converting apparatus can be set to either one of three kinds of operating modes by an instruction of an electrical data signal from the personal computer (hereinafter, referred to as a p-computer) 406.

For example, when the keys M and 1 of the keyboard 406' of the p-computer 406 are pressed, MODE 1, i.e., the camera mode is set. In this mode, characters or symbols are optically read in a manner similar to the foregoing conventional apparatus and pattern data is output to the tactile stimulator 405.

Likewise, by pressing the keys M and 2 of the keyboard 406' of the p-computer 406, MODE 2, i.e., the image mode is set. In this mode, an electrical data signal train (character codes) from the external input apparatus is converted into the two-dimensional pattern data. This pattern data is output to the tactile stimulator 405. In the image mode, by properly combining the input data (codes), an image such as character, symbol, graphic, or the like can be expressed. Therefore, by previously storing data of characters symbols, graphics, etc. to be expressed into a memory in the p-computer 406, a desired image can be repeatedly output to the tactile stimulator 405. For example, when a moving pattern data of the character "T" was input from the p-computer 406 to the main unit 404, a pattern of the shape of "T" is moved, e.g., from the right to the left and is output and displayed to the tactile stimulator 405. This state is sequentially illustrated in FIGS. 18(A) to 18(E). In these diagrams, a black point ● denotes the position of the vibrating pin and a white point o indicates the position of the pin which does not vibrate.

When the keys M and 3 of the keyboard 406' of the p-computer 406 are pressed, MODE 3, i.e., the Braille mode is set. In this mode, the input data from the external input apparatus is converted into the Braille. For example, assuming that the input data is the code "A", as shown in FIG. 19(A), the tactile stimulator 405 vibrates in correspondence to the shape of "A" of Braille shown in FIG. 19(C). Assuming that the input data is the code "B", as shown in FIG. 19(B), the tactile stimulator 405 vibrates in correspondence to the actual shape of "B" of Braille shown in FIG. 19(D). In FIGS. 19(A) and 19(B), a black point ● indicates the vibrating portion. In FIGS. 19(C) and 19(D), a black point ● represents the projecting portion.

Further, in each of the foregoing three modes, the data of the vibration pattern displayed in the tactile stimulator 405 can be output to the external apparatus.

Figure 7:
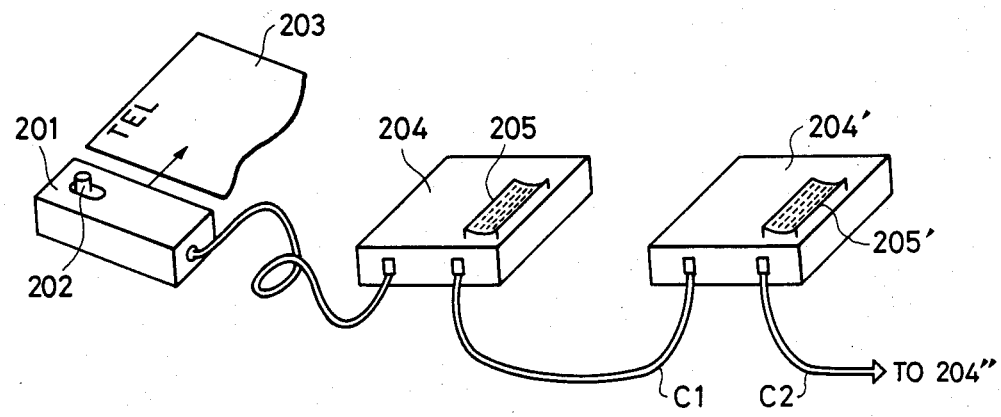
FIG. 7 is a perspective view showing a constitution of a conventional apparatus.
Figure 23:
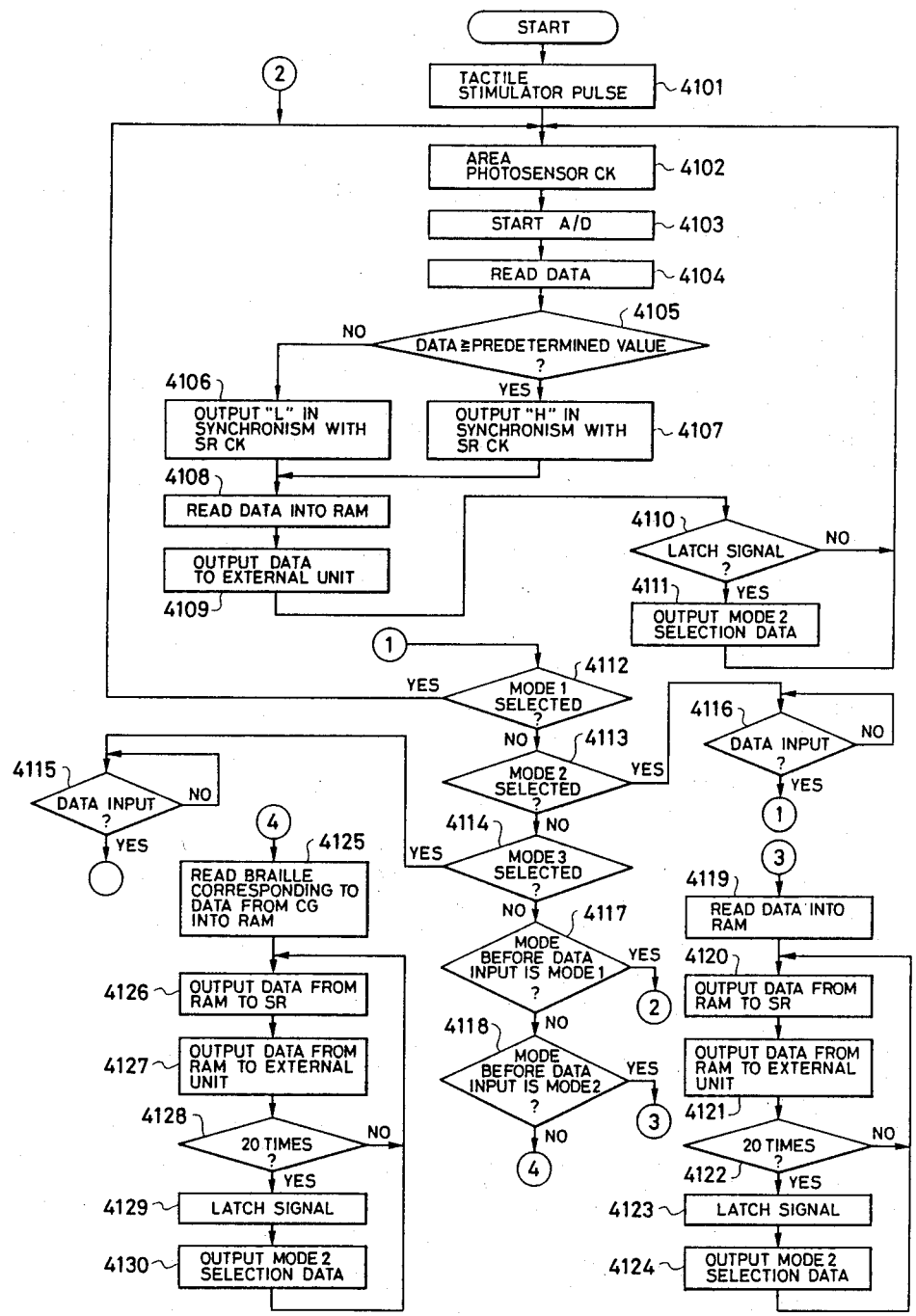
FIG. 23 is a flowchart showing the control operation of a CPU in FIG. 17.

FIG. 20 shows a circuit constitution of the apparatus in the embodiment of the invention of FIG. 7. Reference numeral 407 denotes a CPU (central processing unit) to execute the calculating control operation according to the present invention on the basis of a control procedure as shown in FIG. 23, which will be explained hereinafter; 408 is a character generator (C.G.) to convert internal codes into image pattern and Braille pattern of character or symbol; and 409 is an A/D converter as photoelectric conversion means which constitutes the camera 401. The A/D converter 409 converts the analog output of an area photosensor 410 into the digital data and sends the digital image signal to the CPU 407. Numeral 411 denotes a shift register for storing the vibration pattern signal from the CPU 407 on a predetermined unit basis, e.g., on a one-column unit basis and for outputting; 412 is a driver to drive the tactile stimulator 405 in accordance with the output data of the shift register 411; and 413 is an interface for performing the input and output of data between the personal computer 406 as an external apparatus and another image converting apparatus 415 of the same content.

The CPU 407 outputs a clock to drive the sensor to the area photosensor 410 consisting of the same number of (i.e., 5×20) photosensors arranged in a matrix form as the number of vibration pins of the tactile stimulator 405. The area photosensor 410 outputs in parallel the voltage proportional to an amount of light at each of (5×20) cross points synchronously with the clock. This output is converted into the digital data by the A/D converter 409. The CPU 407 outputs the "H" (high) level signal to the shift register 411 when the value of the digital data is larger than or equal to a predetermined value (threshold value). When it is smaller than the predetermined value, the CPU 407 outputs the "L" (low) level signal to the shift register 411. On the other hand, each time twenty clocks are input from the CPU 407, the area photosensor 410 outputs the latch signal LS.

For example, the timing relations among the clock CK for the area photosensor when the camera read the character "T", the digital data (1 to 5) of the area photosensor 410 after the A/D conversion, and the latch signal LS are shown in FIGS. 21(A) to 21(G). As shown in these diagrams, the data (1 to 5) of the area photosensor 410 is sent to the shift register 411 synchronously with the clock CK. Twenty data stored in the shift register 411 are output to the driver 412 by the latch signal LS of the area photosensor 410.

On the other hand, pulses of about 230 Hz to vibrate the tactile stimulator 412 are input from the CPU 407 to the driver 412. The destination to which the pulses of 230 Hz are output is controlled by the data of the shift register 411.

By pressing the keys M and 2 of the keyboard of the p-computer 406, the image mode of MODE 2 is selected. In this mode, the CPU 407 outputs the input data from the p-computer 406 to the shift register 411 synchronously with the clock. At this time, for example, in the case of outputting the character "T" to the tactile stimulator 405, the data from the p-computer 406 is set to such data as 1F, 04, 04, . . . , 04 in hexadecimal notation as shown in FIG. 22.

Figure 22:
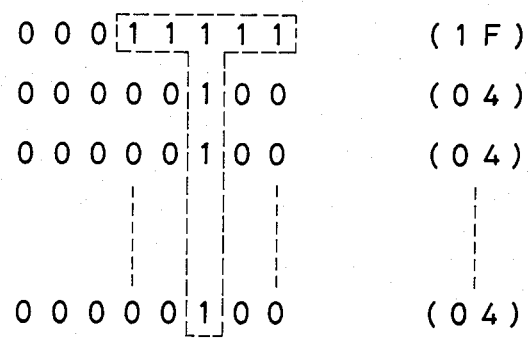
FIG. 22 is a diagrammatical view showing the relation between the input signal from the outside and the output pattern.

In FIG. 22, the first output data (1F) is shown in the first column in the top portion. The second output data (04) is shown in the second column. In this manner, the output data is sequentially shown. For this output data, lower five bits among eight bits are used.

When the foregoing data is sent from the p-computer 406, the CPU 407 sequentially stores the data into an RAM (random access memory) 414. Twenty data at this time correspond to the data of one image plane. The data stored in the RAM 414 is sequentially output to the shift register 411 irrespective of the input from the external apparatus. Each time the twentieth data content in the RAM 414 is output, the latch signal LS is sent from the area photosensor 410. The data stored in the shift register 411 is sent to the driver 412. A vibrating range of the tactile stimulator 405 is controlled in accordance with this data.

In this manner, the CPU 407 once stores the data sent from the p-computer 406 into the RAM 414. The data is transferred from the RAM 414 to the shift register 411. Further, the vibration of the tactile stimulator 405 is controlled by the data through the driver 412.

By pressing the keys [M] and [3] of the keyboard of the p-computer 406, the Braille mode of MODE 3 is selected. In this mode, the CPU 407 selectively reads the Braille pattern corresponding to the code data input from the p-computer 406 from the character generator 408. For example, twenty hexadecimal data as Braille patterns as shown in FIGS. 18(A) and 18(B) are stored in the character generator 408. Each time one data is input, twenty hexadecimal data are stored into the RAM 414. The Braille data stored in the RAM 414 is output to the tactile stimulator 405 in a manner similar to the case of MODE 2.

Further, in the foregoing three modes, the pattern data of the tactile stimulator 405 as a sensing display device is displayed by the tactile stimulator 405 and is also output to the outside through the interface 413. The data which is output to the outside is sequentially output from the RAM 414 in a manner similar to the case of outputting to the tactile stimulator 405. Each time the data is output twenty times, data for selecting MODE 2 is output. When the apparatus 415 on the reception side of the data receives the data to select MODE 2, MODE 2 is set. Thereafter, the data is stored into the RAM in the apparatus 415 and the tactile stimulator vibrates. In this manner, a plurality of same main units 404 can be connected.

FIG. 23 is a flowchart showing the control operation of the CPU 407 in FIG. 20. The control operation of the embodiment of the invention will now be described further in detail with reference to the flowchart of FIG. 23. First, in step 4101, the operation to continuously output pulses of about 230 Hz to vibrate the tactile stimulator 405 is started. In step 4102, one clock is output and sent to the area photosensor 410. In step 4103, the output data of the area photosensor 410 is derived synchronously with the clock output is A/D converted by the A/D converter 409. In step 4104, the A/D converted digital image data is read. In step 4105, a check is made to see if the value of the digital image data is larger than or equal to a predetermined value (threshold value) or not. If it is larger than or equal to the predetermined value, the "H" signal is output to the shift register 411 synchronously with the clock for the shift register (step 4107). If it is smaller than the predetermined value, the "L" signal is output to the shift register 411 synchronously with the clock for the shift register (step 4106).

In step 4108, the value (data) of the "H" or "L" signal is also stored into the RAM 414. In step 4109, the data stored in the RAM 414 is output to the external apparatus 415 through the interface 413.

Further, in step 4110, a check is made to see if the latch signal LS has been input from the area photosensor 410 or not. If NO, the processing routine is returned to step 4102 and the processes in steps 4102 to 4110 are repeated in a manner similar to the above.

If twenty clocks have been input to the area photosensor 410, the latch signal LS is automatically output from the area photosensor 410. Thus, the data stored in the shift register 411 is sent to the driver 412 and the tactile stimulator 405 vibrates by the pulses of about 230 Hz multiplexed to that data. At the same time, since the answer is YES in step 4110, the processing routine advances to step 4111. In step 4111, the code to select MODE 2 is output to the outside through the interface 413 and step 4102 follows again. By outputting the code to select MODE 2, the apparatus on the reception side in the case where a plurality of same apparatuses were connected is set to MODE 2. The input data can be output to the tactile stimulator in each apparatus.

When the data is input from the external apparatus through the interface 413, step 4112 follows by the interruption. In steps 4112, 4113, and 4114, a check is made to see if the input data from the outside is the data to select the mode or not. If it is decided in step 4112 that MODE 1 has been set, step 4102 follows and the foregoing processes in the camera mode are executed. If it is determined in step 4113 that MODE 2 has been set, step 4116 follows. Since the input data from the outside is read and output to the internal tactile stimulator 405 in MODE 2, the apparatus waits for the input of the next data in step 4116. When the next data is input, an interruption occurs and step 4112 follows. If the input data is the output display data to the tactile stimulator 405 in MODE 2, a check is then made in step 4118 to see if the mode in which this data was input is MODE 2 or not. If YES, step 4119 follows and the input data is written into the RAM 414.

In steps 4120 and 4121, the data in the RAM 414 is output to the shift register 411 and outside 415. In step 4122, a check is made to see if the data has been sent twenty times from the RAM 414 or not. If NO, step 4120 follows. If YES, the latch signal is output in step 4123 and the data stored in the shift register 411 is output to the driver 412, thereby vibrating the tactile stimulator 405. Further, in step 4124, the code to select MODE 2 is output to the external apparatus 415 and step 4120 follows. The processes in steps 4120 to 4124 are repeated, thereby outputting the data stored in the RAM 414 to the tactile stimulator 405 and outside.

When the data is input from the outside during steps 4120 to 4124, an interruption is performed and the data is input to the RAM 414. In this manner, the content of the data in the RAM 414 is changed by the new input data and the updated new data content is continuously output from the RAM 414 to the tactile stimulator 405 and outside (refer to FIG. 18).

On the other hand, if it is decided in step 4114 that MODE 3 has been set, step 4115 follows. Since the input data from the outside is read and the Braille corresponding to the input data is output and displayed in MODE 3, the apparatus waits for the input of the next data in step 4115. When the next data is input, an interruption is performed and step 4112 follows. If the input data is the data to convert into the Braille, the mode when the data was input is discriminated in step 4118. Then, step 4125 follows.

In step 4125, the Braille pattern corresponding to the input data is generated from the character generator 408 and written into the RAM 414. The data written in the RAM 414 in this manner is output to the shift register 411 and outside in steps 4126 and 4127 in a manner similar to the case of MODE 2. In step 4128, a check is made to see if the data has been sent from the RAM 414 twenty times or not. If NO, step 4126 follows. If YES, step 4129 follows and the latch signal is output and the data stored in the shift register 411 is output to the driver 412, thereby vibrating the tactile stimulator 405 as a Braille pattern (refer to FIG. 19). Further, the code to select MODE 2 is output to the outside in step 4130. Then, step 4126 follows again.

By repeating the processes in steps 4126 to 4130 in this manner, the data stored in the RAM 414 is output to the tactile stimulator 405 and outside. When data is input from the outside during this period of time, an interruption is performed. The input data is converted into the Braille pattern and input into the RAM 414. As described above, when the data content of the RAM 414 is changed by the new input data, the updated new data content is continuously output as a Braille pattern from the RAM 414 to the tactile stimulator 405 and outside.

The foregoing discriminating steps 4117 and 4118 are provided to discriminate the mode when data was input and to return the operating mode to this mode. For example, if data other than the data to switch the mode is input in MODE 1, the processing routine advances to step 4102 by the discrimination in step 4117 and the operation in MODE 1 is executed. On the other hand, in discriminating steps 4115 and 4116, if the data to switch the mode is input when the apparatus is waiting for the input of the data from the outside, the processing routine advances to the process in each mode by the interruption.

The case of three modes has been described above in the embodiment. However, the invention is not limited to this. For example, if characters, symbols, or graphics of patterns other than the Braille are previously input to the character generator, the character, symbol, or graphic corresponding to the input code from the outside can be output to the tactile stimulator 405.

On the other hand, a character "T" has been shown as an example of input data from the personal computer 406 in the description of MODE 2. However, the invention is not limited to only such a character but a word or sentence can be also input from the personal computer 406. As described above, by simultaneously outputting a word or sentence to a plurality of common apparatuses, the advanced training of the image converting apparatus can be performed.

Further, the key input of, e.g., M 1, M 2, or M 3 has been shown as the mode switching means. However, each key input can be also performed by use of a function key such as, e.g., ESC (escape), or the like.

As described above, according to the invention, since there are provided means for inputting data such as characters, symbols, graphics, or the like from an external apparatus and Braille pattern generating means, the image data from the outside can be directly output or is converted into the Braille pattern and output and displayed by the sensing display device.

On the other hand, according to the invention, since the vibration pattern data output to the sensing display device is also output to the outside, a plurality of image converting apparatuses can be continuously connected and a plurality of blind persons can simultaneously use these apparatuses.

Therefore, according to the invention, when the vibration pattern of the sensing display device is sensed, not only the personal sensing training but also the sensing training by a group of blind persons can be easily performed. The Braille output conversion can be also executed. Thus, it is expected that the apparatus can be more conveniently used for users such as eyesight handicapped persons.

Further, the fifth constitution to solve the fifth problem will now be described.

Figure 24:
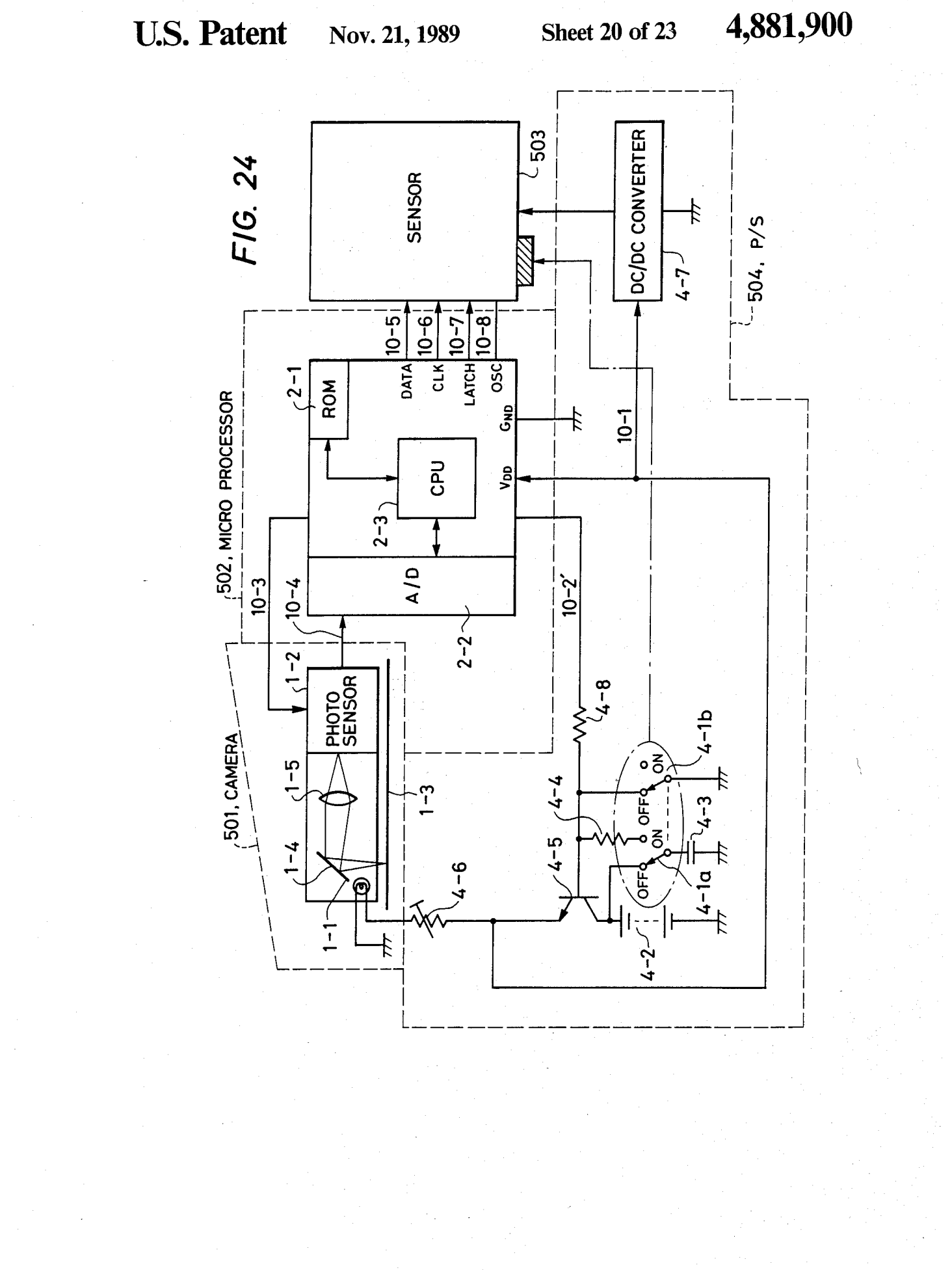

FIG. 24 is a circuit block diagram of an embodiment of an image converting apparatus according to the invention. In the diagram, reference numeral 501 denotes a camera unit to convert a visible image pattern such as printed characters or the like on the paper into an electric signal; 502 is a micro processor to control the whole system constituting the apparatus; 503 a sensing unit to convert the signal processed by the micro processor 502 into the mechanical vibration pattern; and 504 a power source unit to supply an electric power to the apparatus.

Figure 25:
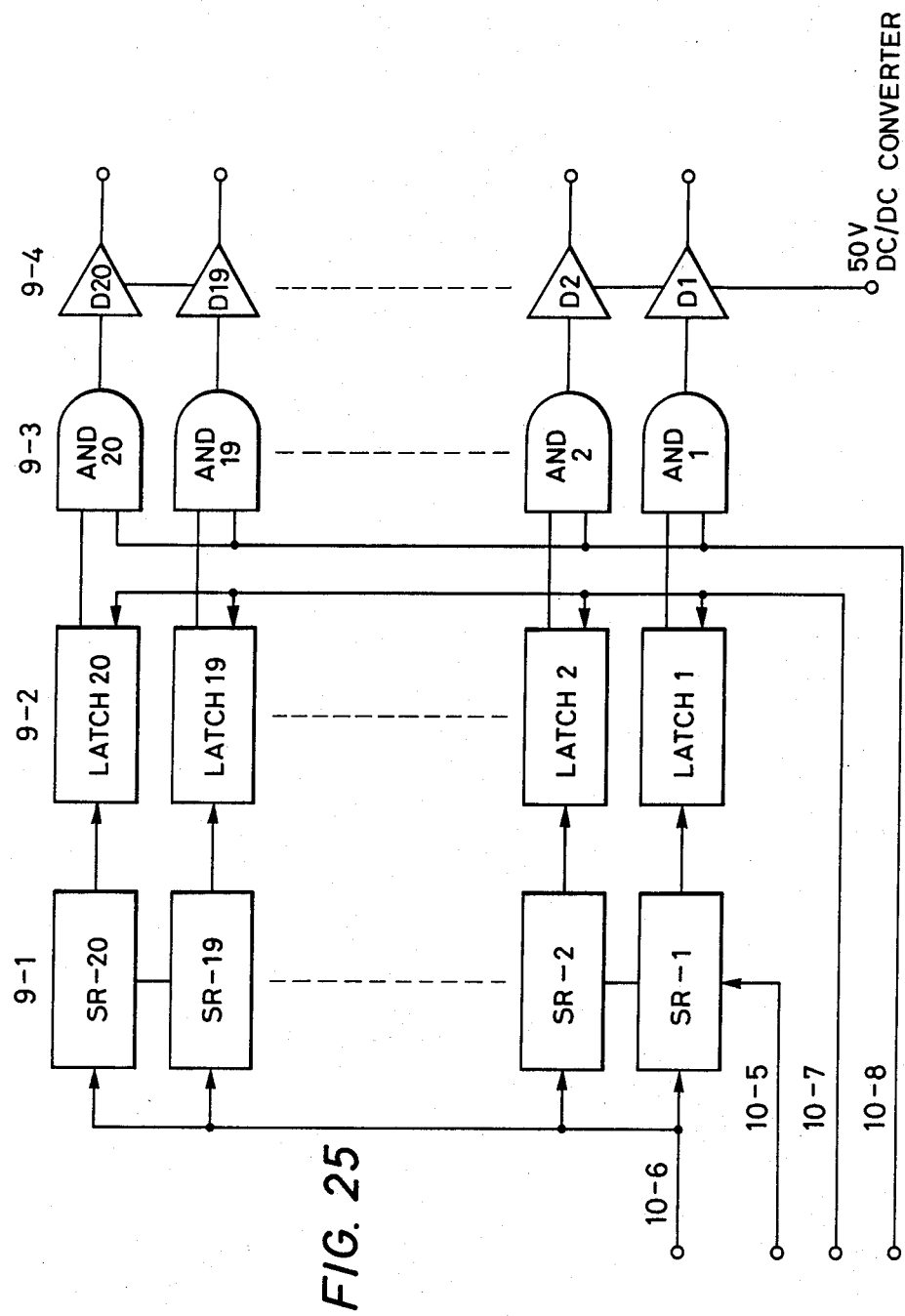
FIG. 25 is a detailed circuit block diagram of a driver in a sensing unit shown in FIG. 24.

The sensing unit 503 consists of five driver ICs (integrated circuits) and $(5 \times 20)$ Bimorph cells whose tips are arranged in a matrix form. One end of a thin metal wire is fixed to each tip of the Bimorph cells. The other end of the metal wire is inserted into a thin hole (not shown) formed in a finger plate (6-1 in FIG. 27). As shown in a circuit block diagram of FIG. 25, the driver IC comprises: twenty shift registers 9-1; twenty latches 9-2; twenty AND gates 9-3; and twenty high voltage drivers 9-4.

An area photosensor 1-2 in the camera unit 501 consists of $(5 \times 20)$ photosensors arranged in a matrix form. There is a one-to-one correspondence relation between the position of each photosensor and the position of each of the Bimorph cells arranged in a matrix form. The same pattern as the character pattern projected onto the area photosensor 1-2 is converted into the presence or absence of the vibration of the Bimorph cells. Further, it is converted into the presence or absence of the vertical vibration of the thin metal wires attached to the tip of the Bimorph cells. The operator senses the vibration pattern which is drawn by the vibrating thin metal wires by the tactile sensation of the finger tip or the like, thereby recognizing the character pattern on the paper.

Figure 26:
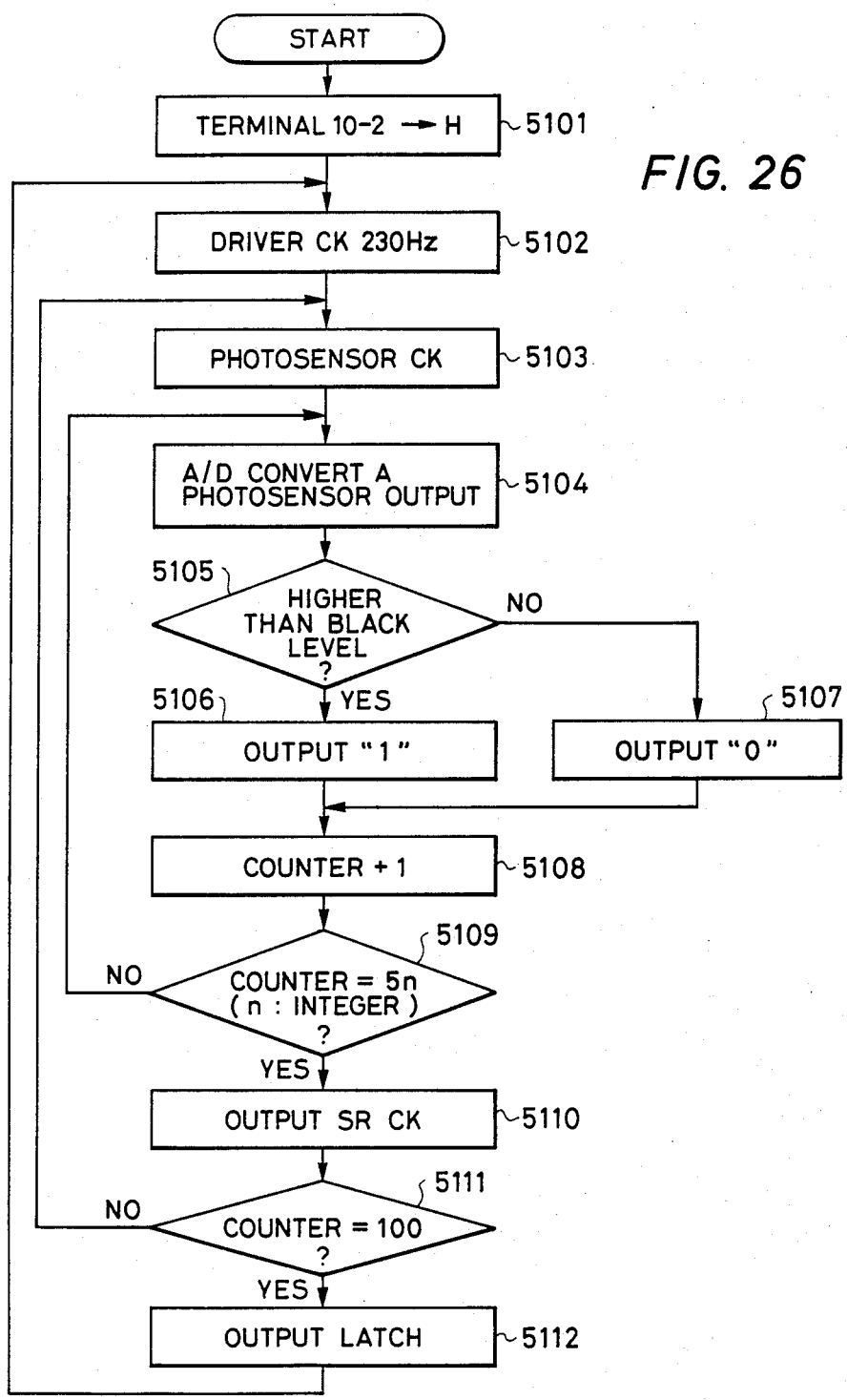
FIG. 26 is a flowchart for a program of a micro processor for use in FIG. 24.

In the power source unit 504, by turning on switches 4-1a and 4-1b, which operate interlockedly, a voltage charged in a capacitor 4-3 is generated from four serially connected nickel cadmium batteries 4-2 and applied to the base of a power control transistor 4-5 through a limiting resistor 4-4. Thus, the transistor 4-5 is made conductive. An electric power is supplied to a lamp 1-1 and a DC (direct current)/DC converter 4-7 through a terminal 10-1 of the micro processor 502 and a luminance adjustment resistor 4-6. By the supply of the electric power, a CPU (central processing unit) 2-3 in the micro processor 502 starts executing the program stored in an ROM (read only memory) 2-1. FIG. 26 shows a flowchart for the program.

Namely, as shown in FIG. 26, in step 5101, a terminal 10-2 of the micro processor 502 is set to the "H" (high) level to thereby keep the transistor 4-5 conductive, so that a voltage is applied to the base thereof through a limiting resistor 4-8.

In step 5102, the micro processor 502 outputs a driver clock signal of the frequency of 230 Hz to drive the Bimorph cells to a terminal 10-6.

In step 5103, a clock pulse for the area photosensor is supplied from a terminal 10-3 of the micro processor 502 to the area photosensor 1-2 consisting of $(5 \times 20)$ photosensors arranged in a matrix form in the camera unit 501, thereby obtaining a photo signal from the photosensors of the first column of the area photosensor 1-2. Thus, the signal corresponding to an amount of reception lights from five photosensors of the first column of the area photosensor 1-2 is input to an input terminal 10-4 of an A/D (analog/digital) converter 2-2 in the micro processor in response to the clock pulse. The character pattern on a printed matter 1-3 illuminated by the lamp 1-1 is projected onto the photo sensitive surface of the area photosensor 1-2 through a mirror 1-4 and a lens 1-5. An output value of each photosensor of the area photosensor 1-2 corresponds to the light intensity of the projected pattern.

In step 5104, one of the output signals from five photosensors of the area photosensor 1-2 is converted into the digital data by the A/D converter 2-2. In the next step 5105, the value of this digital data is compared with a digital value (black level) of a standard black paper. If it is higher than the black level, the "1" signal is output from a terminal 10-5 in step 5106. If it is lower than the black level, the "0" signal is output from the terminal 10-5 in step 5107. Then, step 5108 follows.

In step 5108, "1" is added to the count value of a counter provided in the micro processor 502. In step 5109, a check is made to see if the count value is a multiple of 5. If NO, step 5104 follows again and the processes in steps 5104 to 5109 are repeated until the count value becomes a multiple of 5. Thus, all of the data signals based on the signal from five photosensors of the first column of the area photosensor 1-2 are obtained. In step 5110, the clock signal for the shift register is supplied from the terminal 10-6 to each of the shift register in five driver ICs. Thus, all of the five data signals are stored into the shift registers in five driver ICs, respectively. In this manner, the data signal based on the photo signal from five photosensors of the first column of the area photosensor 1-2 is stored into the first shift register in each driver IC.

In step 5111, a check is made to see if the count value of the counter is 100 or not. If NO, step 5103 follows again and the processes in steps 5103 to 5111 are repeated until the count value becomes 100. Thus, five data signals of the photosensors of the first column of the area photosensor 1-2 are transferred to the shift registers at the second stage in the five driver ICs. At the same time, five data signals of the photosensors of the second column of the area photosensor 1-2 are stored into the shift registers of the same stage. In this manner, similar operations are executed until the twentieth column of the area photosensor 1-2. Finally, the data signals are stored into all of the shift registers 9-1 of each driver IC. In step 5111, if the count value has reached 100, step 5112 follows. In step 5112, a latch signal is input from a micro processor 10-7 to all of the latches 9-2 of all of the driver ICs, thereby holding the data signals stored in all of the shift registers 9-1 into the latches 9-2.

Thus, the AND of the latched data signal and the signal to drive the Bimorph cell of the frequency of 230 Hz which is output from a terminal 10-8 of the micro processor is calculated by each AND gate 9-3. The signal of 230 Hz is output from only the AND gate 9-3 having the latch output of "1". Further, this output signal is converted into a high voltage pulse enough to drive the Bimorph cells by the high voltage driver 9-4 and applied to the Bimorph cells. The DC/DC converter 4-7 is used as a power source of the driver 9-4.

The voltage of the nickel cadmium battery of the power source is increased to about 50 V and used. In this manner, the character pattern on the paper which was image-picked up by the camera unit 501 is converted into the vertical vibrations of the thin metal wires which are interlocked with the Bimorph cells.

The operation when the power switches were turned off while the apparatus is being used will now be described.

When the power switches 4-1a and 4-1b are turned off, the base of the transistor 4-5 is set to the "L" (low) level by the switch 4-1b in spite of the fact that the terminal 10-2 of the micro processor 502 is set to the "H" (high) level. Thus, the transistor 4-5 is made non-conductive and the supply of the electric power to the whole system is shut off. The operation of the apparatus stops.

Figure 27:
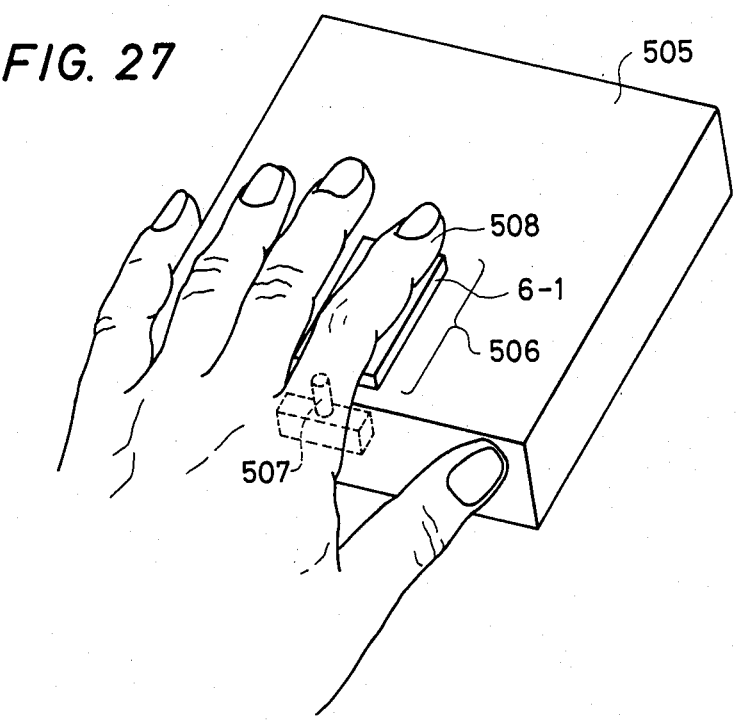
FIG. 27 is an external perspective view of an image converting apparatus.

FIG. 27 shows an external perspective view according to an embodiment of the apparatus of the present invention. In the diagram, reference numeral 505 denotes a main unit casing; 506 is a sensing unit to output a mechanical vibration pattern; 6-1 a finger plate on which a finger or the like is put; 507 an operation button of the power switch; and 508 a finger of the hand of the operator. When the finger is put on the finger plate 6-1 to tactile-read the mechanical vibration pattern which is output to the sensing unit 506, the middle portion between the second and third joints of the finger is come into contact with the operation button 507. Thus, the operation button is depressed and the power switches 4-1a and 4-1b shown in FIG. 24 are turned on. An electric power is supplied to the apparatus in a manner similar to the above.

On the contrary, when the finger is removed from the finger plate 6-1 of the sensing unit 506 after the tactile-reading operation, the operation button 507 of the power switches is pushed up by the forces of springs (not shown) in the switches. Simultaneously, the contacts of the switches are also moved from the ON side to the OFF side, thereby stopping the power supply from the battery 4-2 shown in FIG. 24.

In the foregoing embodiment, the contacts of the switches have been moved by depressing the operation button of the power switches. However, as another embodiment, it is also possible to constitute in a manner such that a change in electrostatic capacity in association with the movement of the finger or the like to the sensing unit is detected and the change amount is converted into the voltage and thereafter, the voltage is applied to the base of the power control transistor 4-5 in FIG. 24. With this constitution, the same effect is obtained.

Further, it is also possible to constitute in a manner such that in place of the power switches used in the foregoing embodiment, a sensor whose resistance value changes by the applied pressure is provided and an output of the sensor is similarly applied to the base of the transistor 4-5 in FIG. 24. With this constitution, the same effect as that of the foregoing embodiment is derived.

Figure 28:
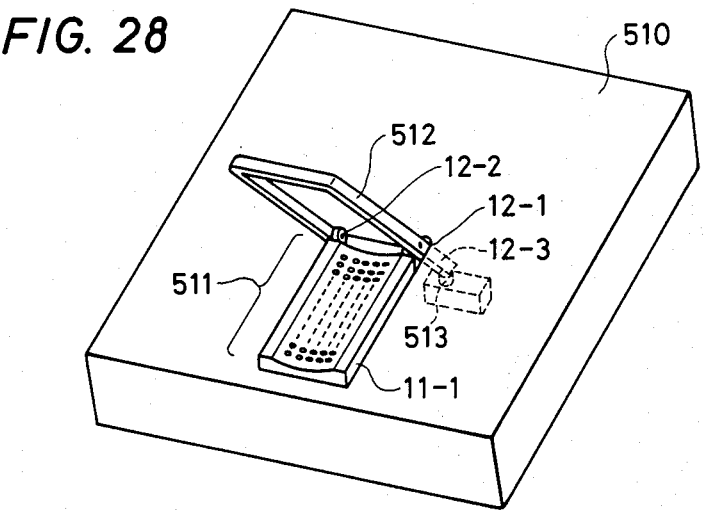
FIG. 28 is an external perspective view of an image converting apparatus.

FIG. 28 shows an embodiment in which the ON/OFF operations of the power switches 4-1a and 4-1b shown in FIG. 24 are performed interlockedly with the opening/closing operations of a cover for protection of the sensing unit. In FIG. 28, reference numeral 510 denotes a main unit casing; 511 is a sensing unit to output a mechanical vibration pattern; 11-1 a finger plate on which the finger or the like is put; 512 a cover to protect the sensing unit; 513 an operation button of the power switches. In this embodiment, while the apparatus is not used for the purpose of keeping or the like, the cover 512 is arranged so as to cover the finger plate 11-1 of the sensing unit. At this time, the cover 512 is rotatable around fulcrums 12-1 and 12-2 as rotational centers. An extended portion 12-3 is formed at the edge of the fulcrum 12-1. However, since the extended portion does not contact the operation button 513 of the power switches, the switches are held in the off state. On the other hand, when the cover 512 is lifted up from the finger plate 11-1 in order to tactile-read, the edge portion of the extended portion 12-3 comes into contact with the operation button 513 and depresses it. Thus, the power switches are turned on and start supplying the electric power from the power source unit to the apparatus. After completion of the tactile reading, the cover 512 is inclined so as to cover the finger plate 11-1. Thus, the edge portion of the extended portion 12-3 of the cover 512 is removed from the operation button 513, thereby turning off the power switches. Therefore, the power source unit is extremely naturally controlled interlockedly with the movement of the hand to prepare for the tactile-reading or with the opening/closing operations of the cover for protection of the sensing unit. The supply of the electric power to the apparatus is turned on and off. Consequently, this embodiment is effective to reduce the fatigue of the operator and the power source battery can be also efficiently used.

We claim:

1. A sensing display apparatus of an image pattern comprising:
   converting means for converting an optical image recorded on a recording medium into an electric signal;
   memory means for storing the electrical signal output from said converting means;
   sensing display means for converting the electric signal output either from said converting means or from said memory means into a mechanical vibration and for displaying it in a tactile manner; and
   selecting means, arranged near said converting means, for selecting between a first mode in which the electric signal converted by said converting means is directly output to said sensing display means, a second mode in which the electric signal converted by said converting means is stored in said memory means, and a third mode in which the electric signal stored in said memory means is output to said sensing display means.

2. An apparatus according to claim 1, wherein said converting means has an area photosensor and said sensing display means has a tactile stimulator.

3. A sensing display apparatus of an image pattern comprising:
   first converting means for converting an optical image recorded on a recording medium into a first electrical image signal;
   second converting means for converting the optical image recorded on the recording medium into a second electrical image signal;
   selecting means for preferentially selecting the second electrical image signal input from said second converting means and selecting the first electrical image signal if the second electrical image signal is not selected and for outputting the selected one of the electrical image signals; and
   sensing display means for converting the electrical image signal output from said selecting means into a mechanical vibration and for displaying it in a tactile manner.

4. An apparatus according to claim 3, wherein when the second electrical image signal is not input for a predetermined period of time, said selecting means selects and outputs the first electrical image signal.

5. A sensing display apparatus of an image pattern comprising:
   converting means for converting an optical image recorded on a recording medium in to an electrical analog signal;
   binarizing means for comparing the analog signal output from said converting means with a predetermined reference level signal, and for binarizing the analog signal, and when a voltage of the reference level signal fluctuates within a predetermined range, for binarizing the analog signal by a voltage set before the voltage fluctuation;
   sensing display means for converting the electric signal binarized by said binarizing means into a mechanical vibration and for displaying it in a tactile manner; and
   variable setting means arranged near said converting means for variably setting the voltage of the reference level signal set to binarize the analog signal by said binarizing means.

6. A sensing display apparatus of an image pattern comprising:
   image reading means for reading optical image data such as characters, symbols, or the like and for converting the data into a two-dimensional pattern signal in accordance with a shape of the data;
   mode designating means for designating a mode of said image reading means;
   signal input means for inputting a data signal including character codes from an external apparatus and the two-dimensional pattern signal;
   signal converting means for converting the data signal input from said signal input means into the two-dimensional pattern signal in the mode designated by mode designating means;
   signal output means for sending to an external apparatus the two-dimensional pattern signal output from said image reading means, said signal input means, or said signal converting means;
   sensing display means for vibrating an array of transducers of a predetermined arrangement in response to the two-dimensional pattern signal output from said image reading means, said signal input means, or said signal converting means; and
   control means for driving the image reading means, the signal input means, and the signal converting means in accordance with the mode designated by said mode designating means.

7. An apparatus according to claim 1, 3, 5, or 6, further comprising power control means for controlling a supply of electric power necessary to drive said sensing display means, said power control means being arranged near said sensing display means.

8. An apparatus according to claim 7, wherein said power control means consists of means for detecting and controlling a mechanical pressure.

9. An apparatus according to claim 7, wherein said power control means consists of means for detecting and controlling a change in electrostatic capacity.

10. An apparatus according to claim 7, wherein said power control means consists of means for detecting and controlling an opening or closing state of a cover member to cover a sensing display portion of said sensing display means.

* * * * *

UNITED STATES PATENT AND TRADEMARK OFFICE
CERTIFICATE OF CORRECTION

PATENT NO.  : 4,881,900
DATED       : November 21, 1989
INVENTOR(S) : Mikiharu Matsuoka, et al.

It is certified that error appears in the above-identified patent and that said Letters Patent is hereby corrected as shown below:

COLUMN 3:

Line 22, "an" should be deleted.

COLUMN 9:

Line 56, "correcting cord $C_1$." should read --connecting cord $C_1$.--.

Line 64, "main unit second 204'" should read --second main unit 204'--.

COLUMN 10:

Line 19, "read" should read --reads--.

COLUMN 14:

Line 44, "arrow" should read --array--.

UNITED STATES PATENT AND TRADEMARK OFFICE
CERTIFICATE OF CORRECTION

PATENT NO. : 4,881,900

DATED : November 21, 1989

INVENTOR(S) : Mikiharu Matsuoka, et al.

It is certified that error appears in the above-identified patent and that said Letters Patent is hereby corrected as shown below:

COLUMN 15:

Line 34, "characters" should read --characters,--.

Signed and Sealed this

Eleventh Day of June, 1991

Attest:

HARRY F. MANBECK, JR.

Attesting Officer

Commissioner of Patents and Trademarks